(12) United States Patent
Sano et al.

(10) Patent No.: US 11,040,471 B2
(45) Date of Patent: Jun. 22, 2021

(54) RESIN PRODUCT, ELECTRONIC DEVICE, AND METHOD OF MAKING RESIN PRODUCT

(71) Applicant: CANON KABUSHIKI KAISHA, Tokyo (JP)

(72) Inventors: Toshiyuki Sano, Tokyo (JP); Kei Oikawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/440,119

(22) Filed: Jun. 13, 2019

(65) Prior Publication Data

US 2019/0389110 A1   Dec. 26, 2019

(30) Foreign Application Priority Data

Jun. 22, 2018 (JP) .............................. JP2018-119321
May 22, 2019 (JP) .............................. JP2019-096109

(51) Int. Cl.
  *B32B 7/02* (2019.01)
  *B29C 45/37* (2006.01)
  *B29K 55/02* (2006.01)
  *B29L 31/34* (2006.01)
  *B29K 25/00* (2006.01)

(52) U.S. Cl.
  CPC ........ *B29C 45/372* (2013.01); *B29K 2025/06* (2013.01); *B29K 2055/02* (2013.01); *B29K 2995/0022* (2013.01); *B29L 2031/3481* (2013.01)

(58) Field of Classification Search
  CPC .............. B29C 45/372; B29K 2025/06; B29K 2055/02; B29K 2995/0022; B29L 2031/3481
  See application file for complete search history.

(56) References Cited

U.S. PATENT DOCUMENTS

| 9,523,796 B2 | 12/2016 | Onomoto et al. |
| 2006/0134381 A1 | 6/2006 | Homburg et al. |
| 2009/0098332 A1 | 4/2009 | Han et al. |

(Continued)

FOREIGN PATENT DOCUMENTS

| JP | 2009-134271 A | 6/2009 |
| JP | 2015-074400 A | 4/2015 |

(Continued)

OTHER PUBLICATIONS

Nagoya et al., U.S. Appl. No. 16/503,820, filed Jul. 5, 2019.

*Primary Examiner* — Lawrence D Ferguson
(74) *Attorney, Agent, or Firm* — Venable LLP

(57) ABSTRACT

A resin product includes an outer surface. The outer surface includes a first area and a second area. The first area includes a surface pattern including a concave and convex portion having a first difference in height. The second area includes a surface pattern including a concave and convex portion having a second difference in height, larger than the first difference in height. An arithmetic average height of a top of a convex portion of the concave and convex portion having the first difference in height is larger than an arithmetic average height of a top of a convex portion of the concave and convex portion having the second difference in height.

11 Claims, 14 Drawing Sheets

(56) References Cited

U.S. PATENT DOCUMENTS

| | | | |
|---|---|---|---|
| 2011/0177303 A1* | 7/2011 | Suehiro | B44C 3/02 |
| | | | 428/195.1 |
| 2012/0196086 A1 | 8/2012 | Shimizu et al. | |
| 2019/0084200 A1 | 3/2019 | Oikawa | |

FOREIGN PATENT DOCUMENTS

| | | |
|---|---|---|
| JP | 2018-176564 A | 11/2018 |
| WO | 2014/104308 A1 | 7/2014 |

* cited by examiner

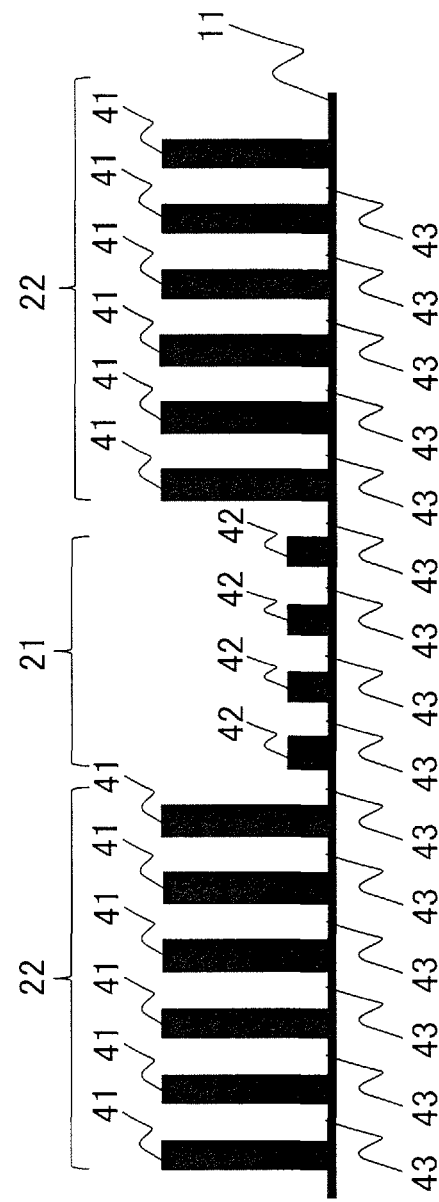

FIG.10A
FIG.10B
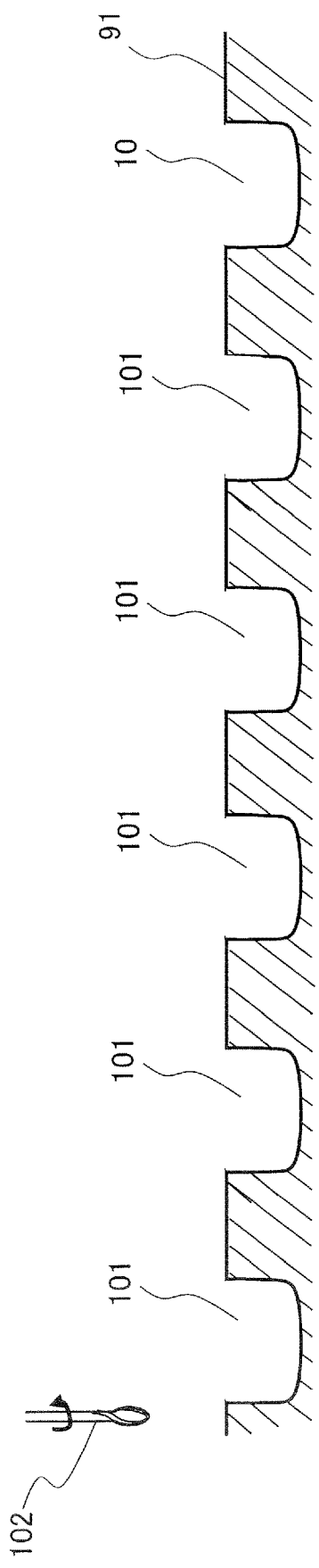
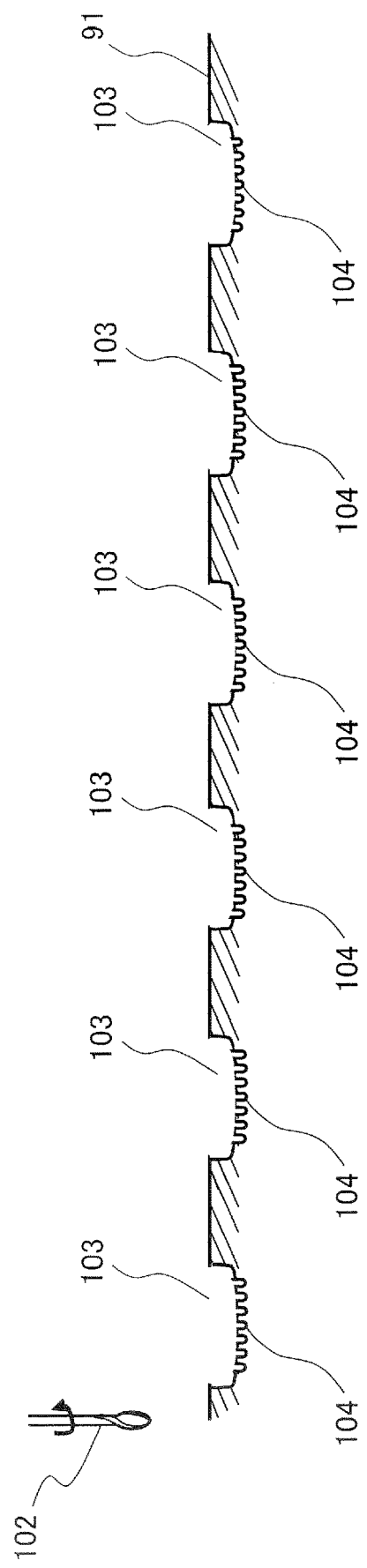

RESIN PRODUCT, ELECTRONIC DEVICE, AND METHOD OF MAKING RESIN PRODUCT

BACKGROUND OF THE INVENTION

Field of the Invention

The present invention relates to a resin product whose outer surface includes a coating area to be coated, an electronic device including the resin product, and a method of making the resin product.

Description of the Related Art

A plate-like or box-like resin component is used in a housing or a case of an electronic device, such as a printer. The outer surface of the resin component is required to have attractive design and functionality such as soil resistance and scratch resistance. For example, Japanese Patent Application Publication No. 2009-134271 proposes an external surface in which glossy concave surfaces and nonglossy convex surfaces are formed. The external surface achieves both of enhancing aesthetic appearance of design pattern and preventing dirt, such as fingerprints, from being noticeable.

The outer surface of the resin component, which is used in a housing or a case of an electronic device, may be required to indicate a maker-name or model-name logo, numerals, characters, a figure, or a trade mark. Such information is given by coating after the resin component is molded. Such coating is achieved by using a method such as hot stamping, which thermally transfers foil onto the resin component. The foil may be made from metal or pigment, and serves as an information bearing member. The coating may be performed by sticking an information bearing member such as a seal, or by painting or spraying paint, pigment, or powder.

Here, the external surface (outer surface) designed as described above and coated to indicate the information may not be a front surface of a housing or a case of an electronic device. For example, the external surface (outer surface), designed as described above and coated to indicate the information, may be a surface of a door or a hatch of the electronic device, or a surface of a resin component which a user can see when opening a cover of the electronic component. Hereinafter, the surfaces (component's surfaces) of the resin component, which are designed as described above and coated to indicate the information and which a user can see, are simply referred to as outer surfaces.

When a logo or other information is formed on an outer surface of a resin component by using hot stamping or other coating method, the outer surface is required to be smooth to some extent, to fix the foil on the outer surface. However, the outer surface of the resin component may have difference in height (that is, may have concave portions and convex portions) for enhancing design and functionality, as described above. Thus, if the difference in height is larger than a predetermined value, and if a logo is formed on the outer surface by using the hot stamping or other coating method, the logo may not be accurately transferred onto the resin component, or may not be completely transferred onto the resin component and easily peel off from the resin component. To avoid this problem, one solution is to smooth an area (coating area) of the outer surface, on which the logo is to be printed (or which is to be coated), by forming no design patterns on the coating area. In this case, however, on a boundary between the coating area and the other area (hereinafter referred to as a non-coating area) in which the design pattern is formed, a visible gap will occur, deteriorating the aesthetic design.

SUMMARY OF THE INVENTION

According to a first aspect of the present invention, a resin product includes an outer surface including a first area and a second area. The first area includes a surface pattern including a concave and convex portion having a first difference in height. The second area includes a surface pattern including a concave and convex portion having a second difference in height, larger than the first difference in height. An arithmetic average height of a top of a convex portion of the concave and convex portion having the first difference in height is larger than an arithmetic average height of a top of a convex portion of the concave and convex portion having the second difference in height.

According to a second aspect of the present invention, a method of making a resin product includes forming a cavity by using a mold having a surface, and injecting resin material into the cavity to transfer a shape of the surface to the resin material. The surface includes a first area in which a plurality of concave portions having a first depth are formed in accordance with a pattern, and a second area in which a plurality of concave portions having a second depth smaller than the first depth are formed in accordance with a pattern. A plurality of concave portions having a third depth smaller than the second depth are formed in each of the plurality of concave portions having the second depth.

Further features of the present invention will become apparent from the following description of exemplary embodiments with reference to the attached drawings.

BRIEF DESCRIPTION OF THE DRAWINGS

FIG. 4 is a diagram illustrating one example of a structure of a resin component which forms an outer surface of an electronic device.

FIG. 10A is a diagram illustrating a process (cutting process) of making the mold used to injection mold the resin component of the embodiment of the present invention.

FIG. 10B is a diagram illustrating another process (cutting process) of making the mold used to injection mold the resin component of the embodiment of the present invention.

DESCRIPTION OF THE EMBODIMENTS

Hereinafter, an embodiment of the present invention will be described with reference to the accompanying drawings. Here, since the configurations described below are merely examples, detailed configurations may be changed as appropriate by a person skilled in the art, without departing the spirit of the present invention. In addition, numerical values described in the present embodiment are examples, and not intended to limit the present invention.

A resin component as described in the following embodiment may be used for an exterior component of an electronic device (such as a printer) which contains electronic components and needs high-quality external appearance, or may be used for an exterior or interior component of a vehicle, such as an automobile. In the following embodiment, the resin component is used for an exterior component of a printer (recording apparatus) with a document reader.

Figure 1:
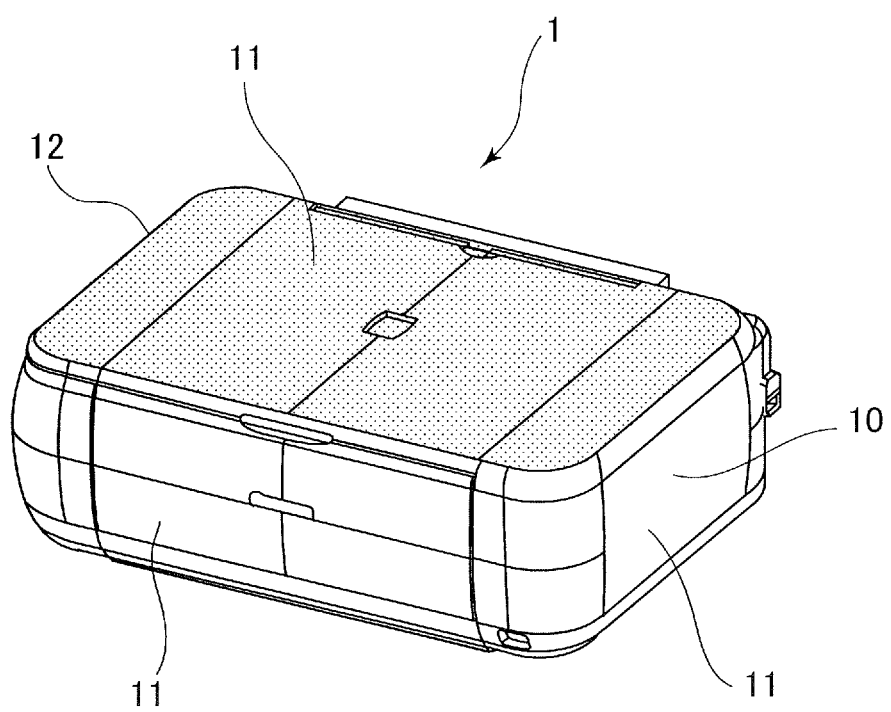
FIG. 1 is a perspective view of a printer which is an electronic device of an embodiment of the present invention.

FIG. 1 illustrates a printer 1 with a document reader, as one example of an electronic device of the embodiment of the present invention. The printer 1 includes a resin component of the present invention. In FIG. 1, the printer 1 is a multifunction printer, for example; and exterior components of a document cover 12 and a housing 10 are made of resin with a predetermined color, such as black. Since an outer surface 11 of the printer 1 is a portion which a user can see, the outer surface 11 is required to have high-quality external appearance. Thus, a design pattern is formed on the outer surface 11.

Figure 2:
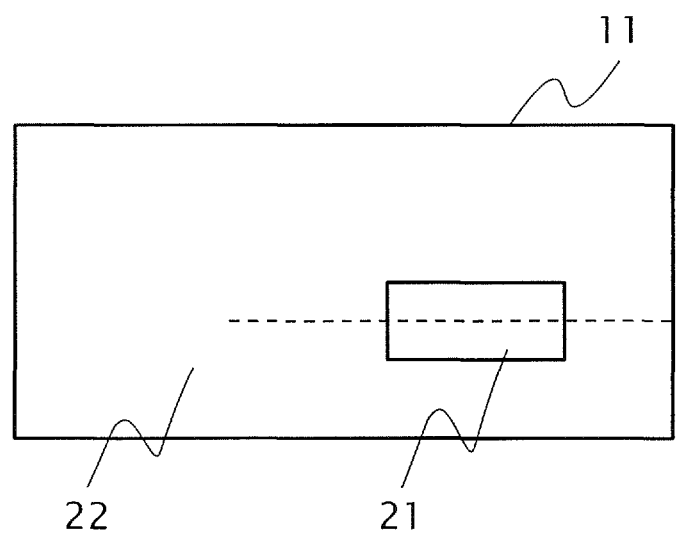
FIG. 2 is a diagram illustrating one example of a structure of a resin component which forms an outer surface of an electronic device.

FIG. 2 is a diagram schematically illustrating an example of an outer surface of a resin component of the document cover 12 of the printer 1 of FIG. 1. As illustrated in FIG. 2, the outer surface 11 of the resin component includes a coating area 21 and a non-coating area 22. The coating area 21 is an area on which coating, such as hot stamping or painting, can be performed to indicate a logo or other information. The non-coating area 22 is an area on which no coating is performed. In the following description, the coating area may be referred to as a first area, and the non-coating area may be referred to as a second area. The coating, such as hot stamping or painting, is performed on one portion of the coating area (first area) 21 to indicate a logo or other information. The portion of the coating area (first area), on which the coating is performed to indicate a logo or other information, may be referred to as a third area. Thus, in the outer surface of the resin component, the coating area (first area) 21 is formed adjacent to the non-coating area (second area) 22, and the third area is formed adjacent to the coating area (first area) 21. The third area is given an information bearing member, such as a logo. The coating area 21 in which the coating is still not performed, and the non-coating area 22 have a surface pattern to enhance design and functionality. The surface pattern is formed by concave portions and convex portions which have difference in height.

Figure 3A:
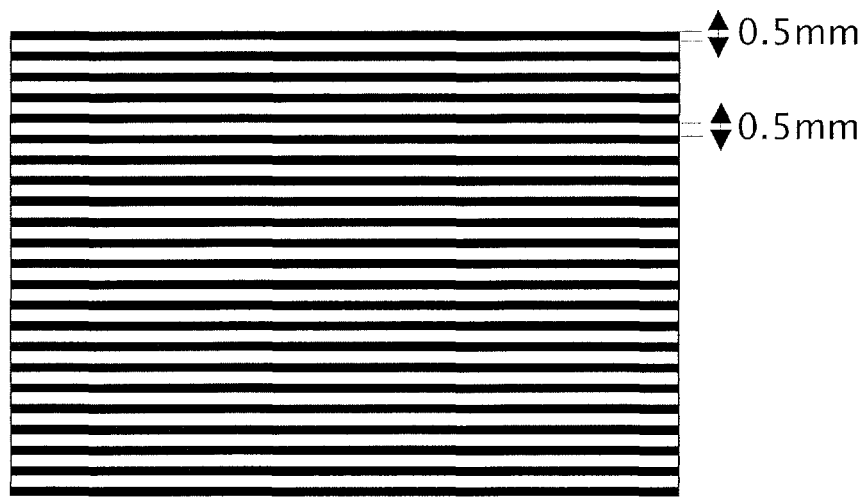
FIG. 3A is a diagram illustrating an example of a structure of an outer surface of the electronic device of the embodiment of the present invention.
Figure 3B:
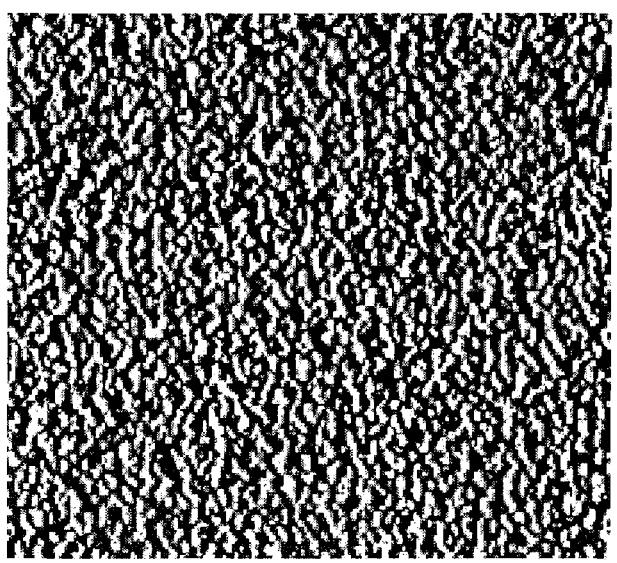
FIG. 3B is a diagram illustrating an example of another structure of the outer surface of the electronic device of the embodiment of the present invention.

FIGS. 3A and 3B are examples of the surface pattern formed on the coating area 21 and the non-coating area 22 of the outer surface 11 of the resin component. The surface pattern forms a rough surface. In FIGS. 3A and 3B, dark-color portions correspond to convex portions of a concave and convex portion, and light-color portions correspond to concave portions of the concave and convex portion. The concave and convex portion forms a rough surface. Here, in the present embodiment, the term "concave portion" does not necessarily mean a portion which is concave with respect to a predetermined reference surface, and the term "convex portion" does not necessarily mean a portion which is convex with respect to a predetermined reference surface. In the present embodiment, the term "concave portion" refers to a portion located lower than a convex portion, and term "convex portion" refers to a portion located higher than a concave portion.

FIG. 3A illustrates a so-called hairline pattern in which linear concave portions and convex portions (concave and convex stripe) are arranged periodically in a predetermined direction. FIG. 3B illustrates a so-called grain pattern in which concave portions and convex portions, having different sizes, are almost randomly arranged. FIG. 4 is a schematic sectional view of the coating area 21 and the non-coating area 22, taken along a broken line of FIG. 2; and illustrates a difference in height between the concave portions and the convex portions.

As illustrated in FIG. 4, for enhancing design and functionality, a rough surface of the non-coating area (second area) 22 is formed by convex portions 41 and concave portions 43 which have a second difference in height. Here, in the conventional configuration, any rough surface having difference in height is not formed in the coating area, and the coating area is made smooth to ensure the coating performed by using hot stamping or other coating method. In contrast to this, the coating area (first area) 21 of the present embodiment has a rough surface (first rough surface) formed by convex portions 42 and the concave portions 43. The convex portions 42 and the concave portions 43 have a difference in height (first difference in height) smaller than the difference in height (second difference in height) between the convex portions 41 and the concave portions 43, which form the non-coating area (second area) 22. In the grain pattern as illustrated in FIG. 3B, the first area and the second area are formed by randomly arranged concave portions and convex portions. The first difference in height and the second difference in height of the present embodiment are expressed as later-described arithmetic average height Sa. The rough surface may be simply referred to as a surface or a front surface.

In FIG. 4, the width (in the outer surface of the resin component) of each of the convex portions 41, the width of each of the convex portions 42, and the width of each of the concave portions 43, which form a rough surface, may be about 0.5 mm in the right-and-left direction in FIG. 4. Thus, the pattern of the coating area 21 and the pattern of the non-coating area 22 are the same as each other, except that the height of the convex portions 41 is different from the height of the convex portions 42.

In general, when the width of the concave portions and the width of the convex portions are smaller than 1 mm, as described above, on the outer rough surface of the resin component, an observer hardly perceives the difference in height between the convex portions 41 and the convex portions 42, which form a rough surface, as a difference in height on the surface of the object. However, when the difference in height between the convex portions 41 and the concave portions 43 is different from the difference in height between the convex portions 42 and the concave portions 43, the reflection property of the non-coating area 22 becomes different from the reflection property of the coating area 21. As a result, the observer perceives the difference in height between the convex portions 41 and the convex portions 42, as a difference in gloss (glossiness) on the surface of the object. Here, an observer tends to perceive a glossiness for each unit area larger than a few square centimeters. Thus, the difference in gloss (glossiness) is often perceived when the height of convex portions of one area which has more than the unit area is different from the height of convex portions of another area which has more than the unit area. In the following description, the gloss of the whole rough surface, perceived due to the difference in height between the concave portions and the convex portions and the arrangement of the concave portions and the convex portions, may be referred to as macro gloss.

In the present embodiment, for reducing the gap in glossiness between the coating area and the non-coating area, a fine rough surface (concave portions and convex portions) is formed at least on each of the tops of the first convex portions, which have the first difference in height between the first convex portions and the concave portions. The fine rough surface has a third difference in height smaller than the first difference in height and the second difference in height. In addition, another fine rough surface (concave portions and convex portions) may be formed on each of the tops of the second convex portions, which have the second difference in height between the second convex portions and the concave portions. The fine rough surface has the third difference in height smaller than the first difference in height and the second difference in height. Thus, the gap in glossiness on the boundary between the coating area and the non-coating area is reduced by combining the rough surface having a larger difference in height, with the fine rough surface formed on each of the tops of the convex portions of the rough surface and having a smaller difference in height.

Figure 5A:
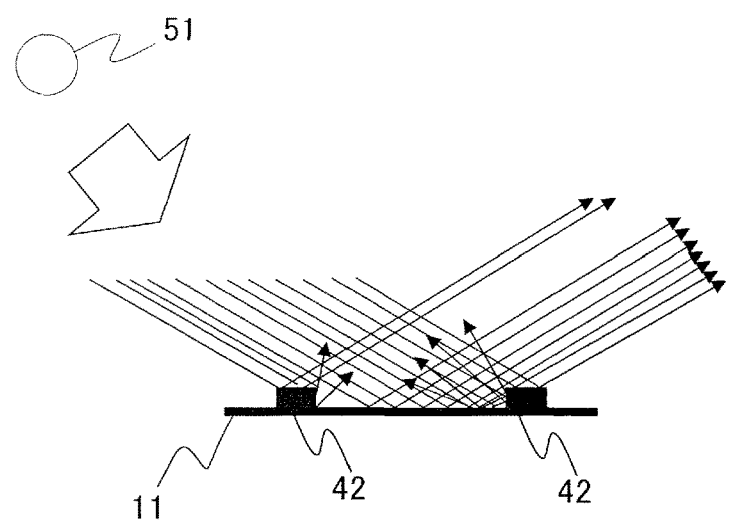
FIG. 5A is a diagram illustrating optical paths of reflected light, obtained when concave portions and convex portions (which forms a surface pattern) of an outer surface of a resin component have a small difference in height.
Figure 5B:
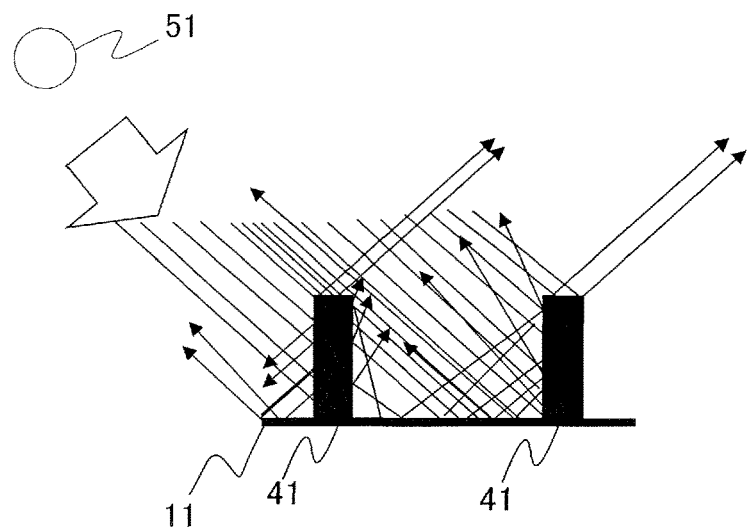
FIG. 5B is a diagram illustrating optical paths of reflected light, obtained when concave portions and convex portions (which forms a surface pattern) of an outer surface of a resin component have a large difference in height.
Figure 5C:
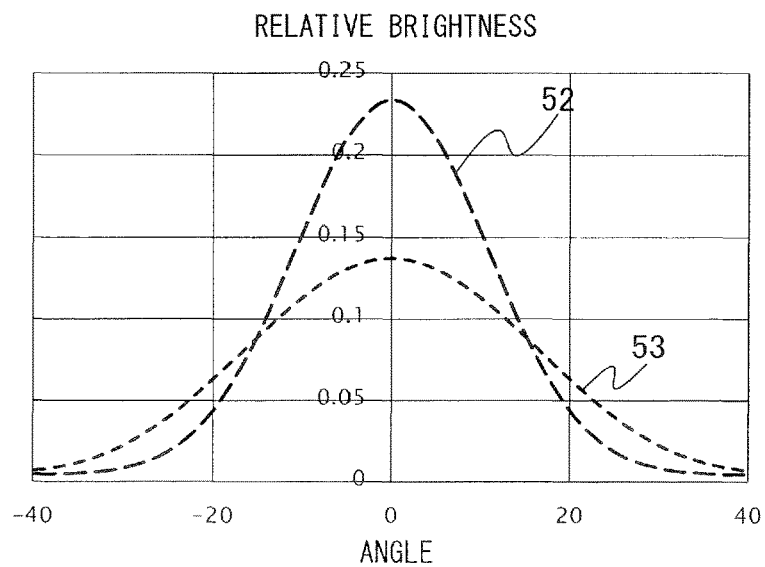
FIG. 5C is a graph illustrating a relationship between the observation angle and the relative brightness.

FIGS. 5A to 5C are diagrams for illustrating relationships between the difference in height (between the concave portions and the convex portions which form a surface pattern) of the rough surface and the reflection property of light. FIG. 5A illustrates the reflection property of light obtained when the difference in height (between the concave portions and the convex portions which form a rough surface) is small. As illustrated in FIG. 5A, when the difference in height (between the concave portions and the convex portions which form a rough surface) is small, most of light emitted from a light source 51 is reflected toward a specular-reflection direction with respect to the bottom surface of the concave portions 43, and toward a specular-reflection direction with respect to the tops of the convex portions 42. In addition, a slight amount of light emitted from the light source 51 is reflected from a side surface of each of the convex portions 42, toward a direction other than the specular-reflection direction with respect to the bottom surface of the concave portions 43. That is, the amount of light reflected toward the specular-reflection direction is large, whereas the amount of light reflected toward the other directions is relatively small. In general, an outer surface of a resin component having such reflection property is glossy for observers.

FIG. 5B illustrates the reflection property of light obtained when the difference in height (between the concave portions and the convex portions which form a rough surface) is larger than that of FIG. 5A. As illustrated in FIG. 5B, when the difference in height between the concave portions and the convex portions is large, the light emitted from the light source 51 is reflected from the convex portions 41, and then repeatedly reflected from the concave portions 43 and the convex portions 41. As a result, more light is reflected toward directions other than the specular-reflection direction with respect to the bottom surface of the concave portions 43 and the specular-reflection direction with respect to the tops of the convex portions 41. That is, when the difference in height (between the concave portions and the convex portions which form a rough surface) is large, the difference between the amount of light reflected toward the specular-reflection direction and the amount of light reflected toward directions other than the specular-reflection direction tends to be relatively small. In general, an outer surface of a resin component having such reflection property is less glossy, for observers, than the outer surface of FIG. 5A.

FIG. 5C is a graph illustrating reflection properties of the rough surfaces of FIGS. 5A and 5B. FIG. 5C illustrates the brightness value obtained when light is emitted from the light source in a 45-degree direction, and obtained by varying the observation angle. The vertical axis represents the relative brightness value, and the horizontal axis represents the observation angle in which the specular-reflection angle is 0 degrees. In FIG. 5C, a broken line 52 indicates a reflection property obtained when the difference in height (between the concave portions and the convex portions which form a rough surface) is small as illustrated in FIG. 5A. In this case, the height of the convex portions with respect to the bottom surface of the concave portions is 10 In addition, a broken line 53 indicates a reflection property obtained when the difference in height (between the concave portions and the convex portions which form a rough surface) is large as illustrated in FIG. 5B. In this case, the height of the convex portions with respect to the bottom surface of the concave portions is 60 μm.

As illustrated by the broken line 52 in FIG. 5C, when the height of the convex portions with respect to the bottom surface of the concave portions is small (10 μm), the brightness is high in the specular-reflection direction (0 degrees), and abruptly decreases as the value of the observation angle increases or decreases from 0 degrees. On the other hand, as illustrated by the broken line 53, when the height of the convex portions with respect to the bottom surface of the concave portions is 60 the brightness value in the specular-reflection direction (0 degrees) becomes smaller than the brightness value in the specular-reflection direction (0 degrees) obtained when the height is 10 and the slope of the brightness (along which the brightness decreases) is more gentle than the slope obtained when the height is 10 even when the value of the observation angle increases or decreases from 0 degrees.

That is, when an observer sees, in the specular-reflection direction, an area in which the height of the convex portions is 10 μm and an area in which the height of the convex portions is 60 the observer perceives that the former area is brighter than the latter area; when the observer sees the areas at an angle equal to or smaller than −20 degrees or equal to or larger than +20 degrees, the observer perceives that the latter area is brighter than the former area. Thus, since the difference in brightness caused by the observation angle is perceived as the difference in glossiness, a visible gap will occur between the coating area 21 and the non-coating area 22, possibly deteriorating the design of the resin component.

In the present embodiment, for reducing the visible gap in glossiness between the coating area 21 and the non-coating area 22, a fine concave and convex portion is formed on each of the tops of the rough surface of at least the coating area 21 (that is, on each of the tops of the convex portions of the concave and convex portion) to adjust the glossiness of the coating area 21. The fine concave and convex portion may be formed also on each of the tops of the rough surface of the non-coating area 22 (that is, on each of the tops of the convex portions of the concave and convex portion) to adjust the glossiness of the non-coating area 22. The fine concave and convex portion may be referred to as a fine rough surface. Here, whether the fine concave and convex portion is formed on each of the tops of the rough surface of the non-coating area 22 may be determined depending on the difference between the height of the convex portions (with respect to the concave portions) of the coating area 21 and the height of the convex portions (with respect to the concave portions) of the non-coating area 22.

Figure 6:
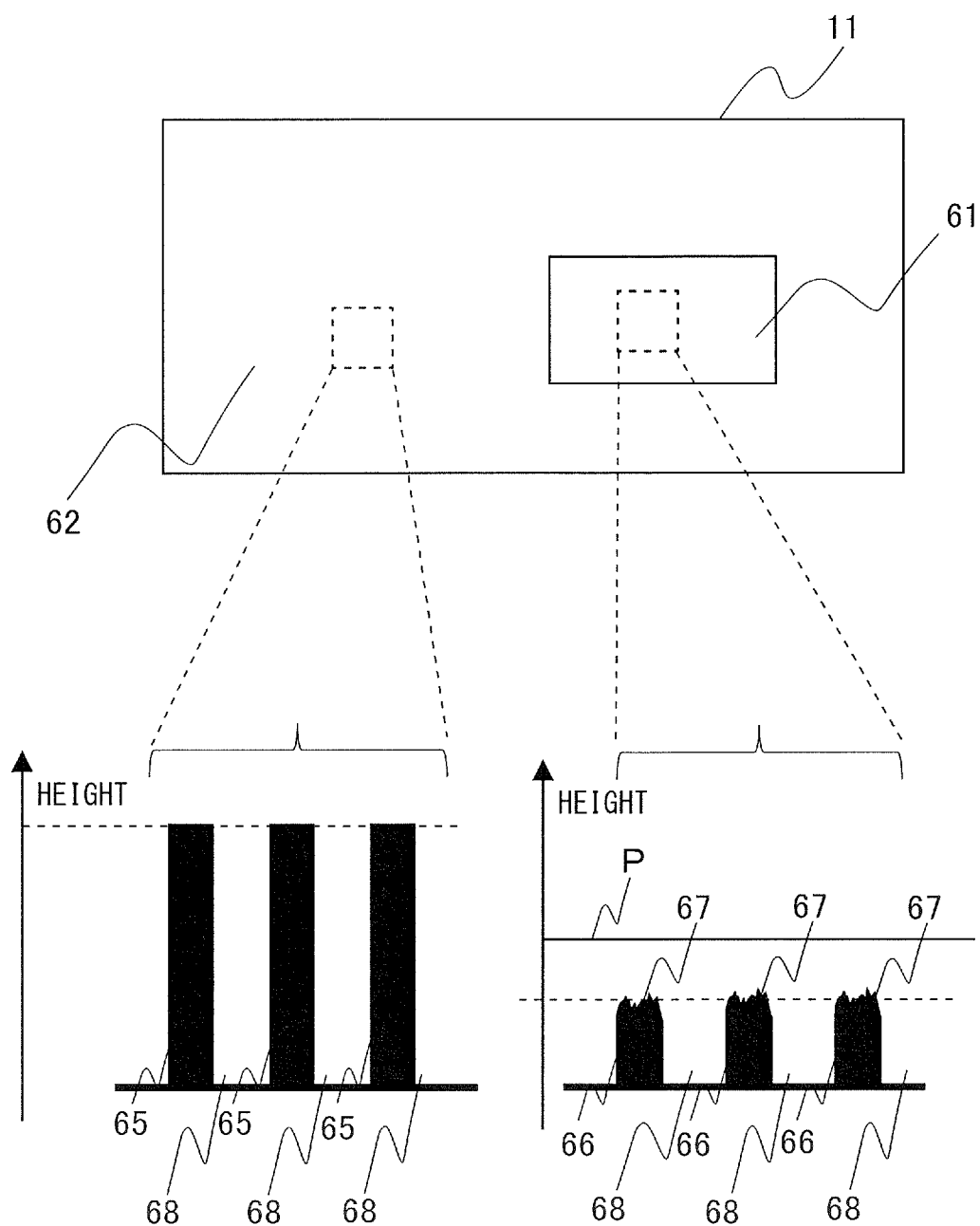
FIG. 6 is a diagram illustrating an example of a structure of an outer surface of an electronic device of the embodiment of the present invention.

FIG. 6 illustrates an example of a structure of the outer surface of the resin component of the present embodiment. Similar to FIG. 2, an upper diagram of FIG. 6 is a plan view illustrating an example in which a coating area 61 and a non-coating area 62 are disposed on the outer surface. In addition, a lower left diagram of FIG. 6 illustrates a structure of a section of one portion of the non-coating area 62, and a lower right diagram of FIG. 6 illustrates a structure of a section of one portion of the coating area 61.

As illustrated in the upper diagram of FIG. 6, the outer surface 11 of the resin component includes a coating area (first area) 61, on which a logo or other information can be given by using coating such as hot stamping, and a non-coating area (second area) 62. The coating area (first area) 61 includes a first rough surface having concave portions 68 and convex portions 66 protruding from the concave portions 68. The non-coating area (second area) 62 includes a second rough surface having concave portions 68 and convex portions 65 protruding from the concave portions 68. As illustrated in the lower right diagram of FIG. 6, one area of the coating area 61 is provided with a coating portion P by using coating, such as hot stamping or painting. The coating portion P allows at least one of characters, numerals, and a figure to be indicated in the coating area 61. The area on which the coating portion P is provided may be referred to as a third area. The third area is adjacent to the first area on which the coating portion P is not provided.

As illustrated in the lower right diagram and the lower left diagram of FIG. 6, the difference in height (first difference in height) between the concave portions and the convex portions (which form a rough surface) of the coating area 61, that is, the height between the bottom surface of the concave portions 68 and the tops of the convex portions 66 is lower than the difference in height (second difference in height) between the concave portions and the convex portions (which form a rough surface) of the non-coating area 62.

In other words, the difference in height (second difference in height) between the concave portions and the convex portions (which form a rough surface) of the non-coating area 62, that is, the height between the bottom surface of the concave portions 68 and the tops of the convex portions 65 is higher than the difference in height (first difference in height) between the concave portions and the convex portions (which form a rough surface) of the coating area 61.

In the upper diagram of FIG. 6, the coating portion P is formed inside a rectangle indicated by a solid line which indicates the outer edge of the coating area 61, with some clearance left between the solid line and the coating portion P. In the upper diagram of FIG. 6, a rectangle indicated by a broken line indicates a surface of the coating area 61 on which the coating portion P is provided. In a portion of the coating area 61 between the rectangle indicated by the broken line and the rectangle indicated by the solid line, the first rough surface including the concave portions 68 and the convex portions 66 and having the first difference in height is exposed to the outside without coated. If the structure of the section of the coating area 61 is the same as the structure of FIG. 5A, the difference in glossiness between the portion outside the solid line of the upper diagram of FIG. 6 and the portion inside the solid line will be perceived by observers.

Thus, as illustrated in the lower right diagram of FIG. 6, in the present embodiment, the fine rough surface 67 is formed on each of the tops of the convex portions 66 which form a rough surface (first rough surface) of the coating area (first area) 61 and have the first difference in height. In the fine rough surface 67, fine concave and convex portions are formed. The difference in height between the concave portions and the convex portions of the fine concave and convex portions is smaller than the difference in height between the concave portions 68 and the convex portions 66 of the first rough surface and the difference in height between the concave portions 68 and the convex portions 65 of the second rough surface, and an arrangement pitch of the fine concave and convex portions is smaller than those of the first rough surface and the second rough surface. Here, an arithmetic average height of the fine rough surface 67 (fine concave-and-convex structure) formed on each of the tops of the convex portions 66 of the coating area (first area) 61 is referred to as a third difference in height. In addition, an arithmetic average height of the second area including the concave portions 68 and the convex portions 65 is referred to as a second difference in height, and an arithmetic average height of the first area including the concave portions 68 and the convex portions 66 is referred to as a first difference in height. Thus, the third difference in height is smaller than the second difference in height and the first difference in height. In addition, the arrangement pitch of the fine concave and convex portions which form the fine rough surface 67 is smaller than the arrangement pitch of the concave portions 68 and the convex portions 66 of the first rough surface, and than the arrangement pitch of the concave portions 68 and the convex portions 65 of the second rough surface.

Thus, in the present embodiment, the fine rough surface 67 having the third difference in height, smaller than the first difference in height of the first area, is formed on each of the tops of the convex portions of the coating area (first area) 61. As a result, the difference in glossiness between the non-coating area 62 and the coating area 61 (in particular, the portion on which the coating portion P is not formed and in which the concave portions 68 and the convex portions 66 are exposed to the outside) is hardly perceived by observers.

Figure 7A:
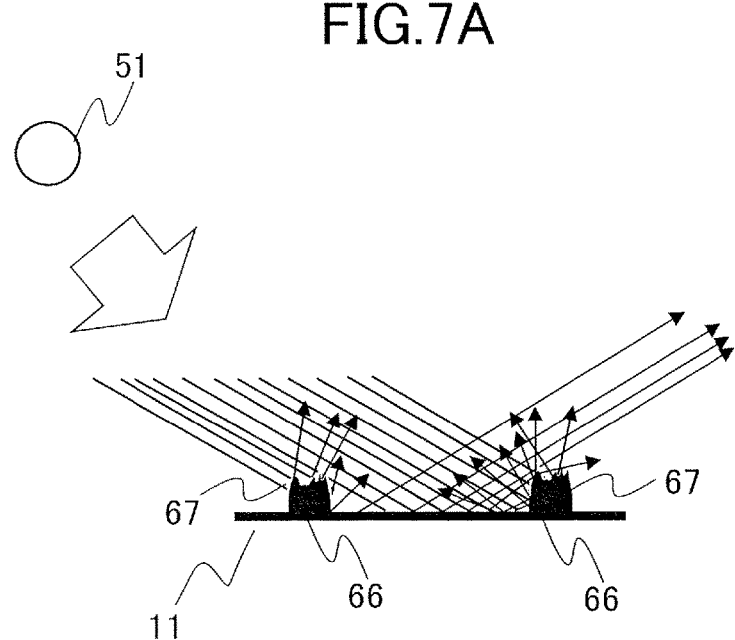
FIG. 7A is a diagram illustrating optical paths of reflected light, obtained when a fine rough surface is formed on each of the tops of convex portions of a convex and concave portion (which form a surface pattern) of an outer surface of a resin component of the embodiment of the present invention.
Figure 7B:
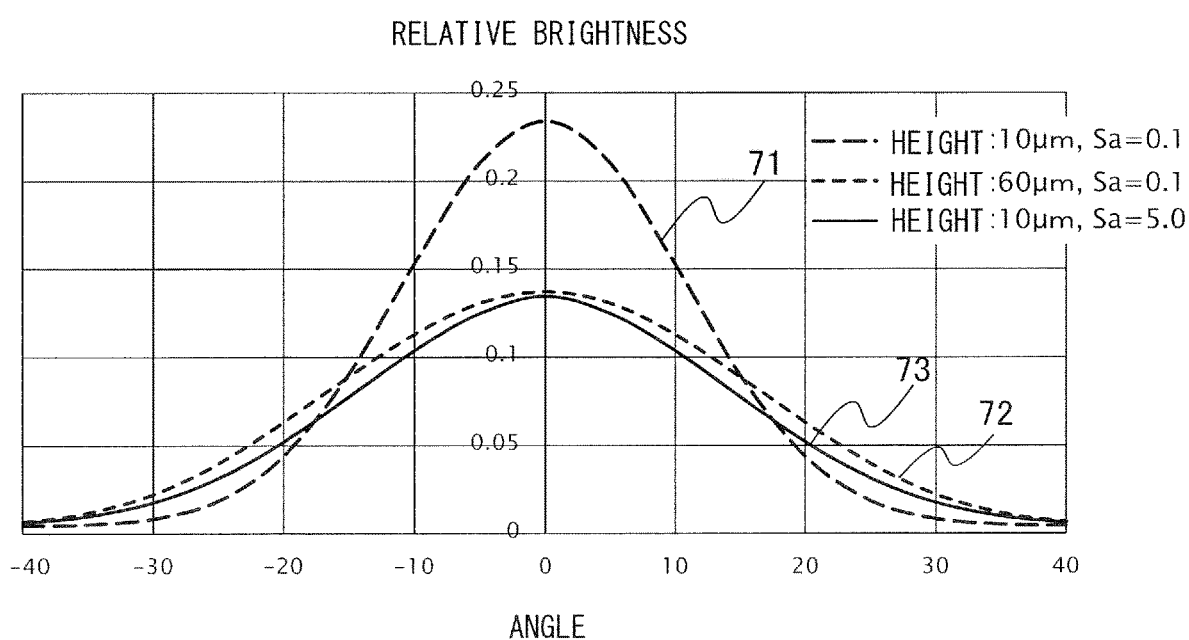
FIG. 7B is a graph illustrating a relationship between the observation angle and the relative brightness, of the resin component of the embodiment of the present invention.

FIGS. 7A and 7B are diagrams for illustrating how the glossiness is adjusted in the present embodiment. The shape of the convex portions 66 of FIG. 7A is the same as the shape of the convex portions 66 of the coating area 61 of the lower right diagram of FIG. 6, and the height of the convex portions 66 is the same as the height of the convex portions 42 of FIG. 5A. However, unlike the convex portions 66 of the lower right diagram of FIG. 6, the convex portions 66 of FIG. 7A are not covered with the coating portion P. That is, FIG. 7A illustrates a section of a portion of the coating area 61 of the upper diagram of FIG. 6, which is not given a logo or other information.

As can be seen from the comparison between FIG. 7A and FIG. 5A, in the structure illustrated in FIG. 5A, most of the light emitted to the convex portions 42 and the concave portions 43 is reflected toward the specular-reflection direction. In contrast to this, in the structure illustrated in FIG. 7A, the light emitted from the light source 51 to the convex portions 66 is scattered toward various directions by the fine rough surface 67 formed on each of the tops of the convex portions 66.

If the structure illustrated in FIG. 5A is molded by injecting resin (that is, using a standard method) so that the convex portions 42 have a height of 10 the surface of the convex portions 42 is smooth. For example, an arithmetic average height (difference in height) Sa of the tops of the convex portions 42, molded by using a mold with a smooth surface, is about 0.1.

Here, the arithmetic average height Sa is defined in ISO 25178, and decreases as the surface of a structure becomes smoother and increases as the surface becomes rougher. In the structure illustrated in FIG. 5A and having no fine rough surface, when the height of the convex portions 42 of the concave and convex portions is 10 μm and Sa is 0.1, the reflection property of the surface of the structure is indicated by a broken line 71 of FIG. 7B.

The style of FIG. 7B is the same as that of FIG. 5C, and the curved broken line 71 of FIG. 7B is equal to the curved broken line 52 of FIG. 5C. As described above, since the broken line 52 of FIG. 5C indicates the reflection property in which most of the light emitted from the light source is reflected toward the specular-reflection direction, the brightness is high in the specular-reflection direction.

On the other hand, in the structure which is the same as that of FIG. 5B and which has no fine rough surface, when the height of the convex portions 41 of the concave and convex portions is 60 μm and Sa is 0.1, the reflection property of the surface of the structure is indicated by a broken line 72 of FIG. 7B. The curved broken line 72 of FIG. 7B is equal to the curved broken line 53 of FIG. 5C. As described above, when the height of the convex portions 41 of the concave and convex portions is high (60 μm), the light blocked by the convex portions 41 is reflected toward various directions. As a result, the light reflected toward the specular-reflection direction decreases.

As illustrated in FIG. 7A, when the difference in height (first difference in height) of the convex portions 66 of the concave and convex portions is 10 μm, and when the structure has the fine rough surface 67 in which the arithmetic average height Sa (third difference in height) is about 5.0, the reflection property of the structure is indicated by a curved solid line 73 of FIG. 7B.

Here, as described above, the convex portions 66 of FIG. 7A is the same in height (first difference in height: 10 μm) as the convex portions 42 of FIG. 5A. However, the tops of the convex portions 66 of FIG. 7A have the arithmetic average height (third difference in height) Sa of 5.0. Thus, since the tops of the convex portions 66 each have the fine rough surface 67, the surfaces of the tops of the convex portions 66 are rougher than the surfaces of the tops of the convex portions 42 of FIG. 5A, which are smooth.

As illustrated in FIG. 7A, in the present embodiment, since the fine rough surface 67 is formed on each of the tops of the convex portions 66 (which form a rough surface) of the coating area (first area) 61, the light from the light source is reflected at various angles, so that the brightness decreases in the specular-reflection direction. That is, even with the height of 10 μm of the convex portions 66 of the coating area (first area) 61, if the tops of the convex portions 66 each have the fine rough surface 67, the brightness property of the coating area (first area) (indicated by the solid line 73) becomes almost equal to the brightness property (indicated by the broken line 72) of the non-coating area (second area) 62 having the convex portions with a height of 60 μm.

As described above, in the present embodiment, the fine rough surface 67 is formed on each of the tops of the convex portions (which form a rough surface) of the concave and convex portions of the coating area (first area) 61. The concave and convex portions have the relatively small difference in height (first difference in height). With this structure, the reflection property (brightness property) of the third area, which is in the coating area (first area) 61 and on which the coating portion P is not formed (so that the concave and convex portions having the first difference in height are exposed to the outside), can be almost equal to the reflection property (brightness property) of the non-coating area (second area) 62 adjacent to the third area.

The solid line 73 and the broken line 72 of FIG. 7B indicate that the difference in glossiness between the third area, on which the coating portion P is not formed and the concave and convex portions having the first difference in height are exposed to the outside, and the non-coating area (second area) 62 adjacent to the third area is hardly perceived regardless of the observation angle. As a result, when an observer sees the resin component in various directions, the observer will hardly perceive the change in glossiness of a design pattern, caused in the vicinity of the portion on which a logo or other information is given. Consequently, an aesthetic appearance and displaying of information can be both achieved.

Here, in the structure illustrated in FIGS. 6 and 7A, the height of the convex portions 65 of the non-coating area 62 with respect to the concave portions 68 may be equal to or larger than 15 µm and smaller than 500 µm, and preferably, equal to or larger than 40 µm and smaller than 500 µm. This is because, if the rough surface (second area) is formed by the concave and convex portions having a difference in height equal to or larger than 40 µm, the outer surface of the non-coating area 62 can have soil resistance which prevents dirt such as fingerprints. On the other hand, the reason that the difference in height (second difference in height) of the convex portions 65 of the non-coating area 62 is made smaller than 500 µm is as follows: if the difference in height is equal to or larger than 500 µm, the concave portions (which form a rough surface) can be seen only in a small range of the observation angle, which causes the deterioration of the design. For example, a rough surface whose difference in height is equal to or larger than 500 µm may reduce a sense of high quality when seen at a certain observation angle. As described above, the difference in height (second difference in height) between the tops of the convex portions 65 and the bottom surface of the concave portions 68 in the non-coating area 62 is preferably equal to or larger than 40 µm and smaller than 500 µm.

The difference in height between the tops of the convex portions 66 and the bottom surface of the concave portions 68 of the coating area (first area) 61, and the difference in height between the tops of the convex portions 65 and the bottom surface of the concave portions 68 of the non-coating area (second area) 62 can be measured by using a white-light interferometer, for example. In this case, a reference glossy plate having the same height as that of the concave portions of the first area and the second area is first disposed outside the resin component. Then the height of the tops of the coating area (first area) 61, which is less glossy, and the height of the tops of the non-coating area (second area) 62, which is also less glossy, can be measured by using the white-light interferometer, with reference to the reference glossy plate. The white-light interferometer may be three-dimension optical surface profiler NewView 7000 (product name) manufactured by ZYGO Corporation. In this measurement, for measuring a difference in height of the surface, differences in height of ten points of an area (1.0×1.4 mm) of the molded product may be measured by using an objective lens with a ten-fold magnification, and an average of the measured values may be determined as the difference in height of the rough surface.

Here, the reflection properties of the coating area (first area) 61 and the non-coating area (second area) 62 described herein were measured by using a glossmeter which measures, based on JIS Z 8741, specular glossiness (60° specular glossiness) produced by the light reflected at an angle of 60 degrees. In the measurement, a handy type gloss meter PG-1M (product name: APERTURE 1X1CM) manufactured by NIPPON DENSHOKU INDUSTRIES CO. LTD. was used. The reflection angle setting of the gloss meter was adjusted into 60 degrees, then a measurement switch was pressed while a photometer of the glossmeter was pressed against a portion whose glossiness was to be measured, and then the measurement was performed. Thus, with values obtained in the measurement, the 60° specular glossiness of the coating area (first area) 61, in which the fine rough surface 67 is formed on each of the tops of the convex portions, and the 60° specular glossiness of the non-coating area (second area) 62 were evaluated.

In this manner, by using the 60° specular glossiness, the first difference in height of the coating area (first rough surface) 61, the second difference in height of the non-coating area (second area) 62, and the third difference in height (arithmetic average height Sa) of the fine rough surface 67, formed on each of the tops of the first area, can be determined.

For example, various values may be set for the differences in height, and 60° specular glossiness of the outer rough surfaces of the resin component may be measured. Then, the differences in height of the rough surfaces and a pitch of the concave and convex portions may be determined so that the difference in 60° specular glossiness between the coating area (first area) 61, in which the fine rough surface 67 is formed on each of the tops of the convex portions, and the non-coating area (second area) 62 is within 10.

The present embodiment, in which the fine rough surface 67 is formed on each of the tops of the coating area (first area) 61, easily allows the difference in 60° specular glossiness between the coating area (first area) 61 and the non-coating area (second area) 62 to be equal to or smaller than 10. When the difference in 60° specular glossiness between the coating area (first area) 61 and the non-coating area (second area) 62 is equal to or smaller than 10, the visible gap is hardly perceived by observers. Thus, the present invention provides a resin component having a coating area on which the coating can be performed without any trouble, and having less visible gap on the boundary between the coating area and the non-coating area and more excellent design in the whole outer surface. In addition, the present embodiment provides an electronic device including the resin component, used as an exterior component of the electronic device.

In the coating area 61, the sum of the height of the convex portions 66 and the height of the fine rough surface 67 (that is, the sum of the first difference in height and the third difference in height) is preferably smaller than 15 µm. According to the result of an experiment performed by the present inventors, when the first difference in height between the concave portions and the convex portions which form the coating area (first area) 61 is equal to or smaller than 15 µm, the coating portion P can be formed by using coating such as hot stamping, without the transfer and the fixing being affected. In the above-described structure, since the convex portions 66 and the fine rough surface 67 of the coating area 61 is formed so that the sum of the first difference in height and the third difference in height is equal to or smaller than 15 µm, coating such as hot stamping can be suitably performed. Furthermore, as described with reference to FIG. 7B, the difference in macro gloss between the non-coating area (second area) 62 and the coating area 61 on which the coating portion P is not formed, that is, the third area can be suppressed from perceived by observers.

Here, resin of resin components manufactured by using a mold, which is made by using a later-described method, may be acrylonitrile butadiene styrene (ABS) or high impact polystyrene (HIPS), but the composition or name of the resin is not intended to limit the present invention.

Next, one example of a method for machining a mold used to manufacture the resin component of the present embodiment will be described. The resin component of the present embodiment can be molded by injecting resin from a gate into a cavity formed in the mold, and by filling the cavity with the resin. The resin component is manufactured by transferring a shape formed on a cavity-forming surface of the mold, to the resin.

Figure 8:
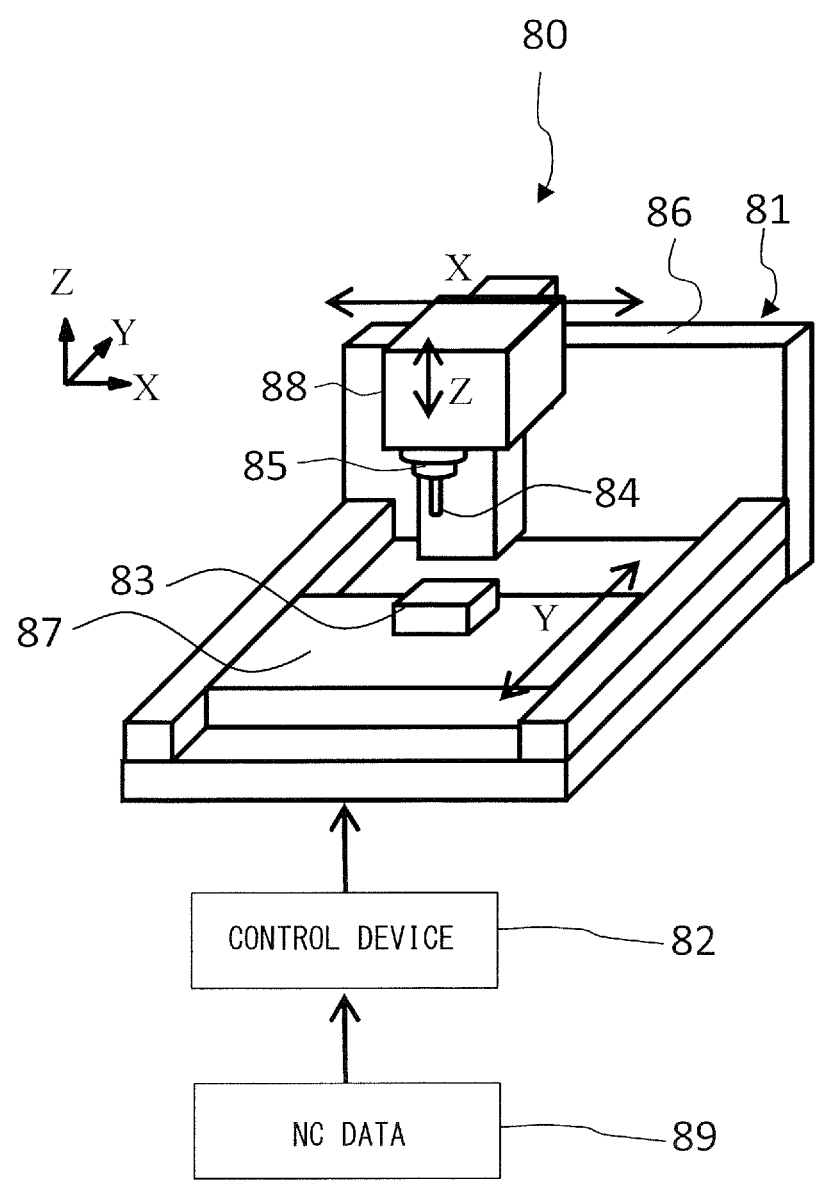
FIG. 8 is a diagram illustrating one example of an apparatus which machines a mold used for the resin component of the embodiment of the present invention.

FIG. 8 illustrates a machining center 80 used to machine the mold of the present embodiment. The machining center 80 of FIG. 8 includes a machine body 81 and a control device 82. The cavity of the mold machined by using the machining center 80 may be formed by a plurality of pieces (which may be referred to as cavity pieces) which form one portion of the mold. If the cavity is formed by the pieces, the transfer surface can be divided into pieces of the surface, and the pieces of the surface can be individually machined. Thus, even though a molded product has a complex shape, production cost for the molded product can be reduced.

The machine body 81 is used to make the mold (cavity piece) 83 by cutting the mold 83. The machine body 81 includes a spindle 85, an X stage 86, a Y stage 87, and a Z stage 88. The spindle 85 supports a cutting tool 84.

As the cutting tool 84, an end mill may be suitably used. The spindle 85 rotates the cutting tool 84 on a Z axis. The Z stage 88 supports the spindle 85, and moves the cutting tool 84 in a Z-direction with respect to the mold 83. Similarly, the X stage 86 moves the cutting tool 84 in an X-direction with respect to the mold 83, and the Y stage 87 moves the cutting tool 84 in a Y-direction with respect to the mold 83. With this configuration, the machine body 81 moves an end of the cutting tool 84 in the X-, Y-, or Z-direction with respect to the mold 83, while rotating the cutting tool 84.

The control device 82 is a computer including a CPU and a memory, and controls the machine body 81 depending on NC data 89. The NC data 89 contains various instructions used in cutting process, such as the amount of movement in the X-direction, the amount of movement in the Y-direction, the amount of movement in the Z-direction, rotational speed of the spindle, feed speed in the X-direction, feed speed in the Y-direction, and feed speed in the Z-direction. The control device 82 controls the machine body 81 by using the NC data 89, and thereby can move the cutting tool 84 with respect to the mold 83 while rotating the cutting tool 84, so that a three-dimensional shape based on the NC data 89 can be formed in the mold 83 by cutting the mold 83.

Figure 9A:
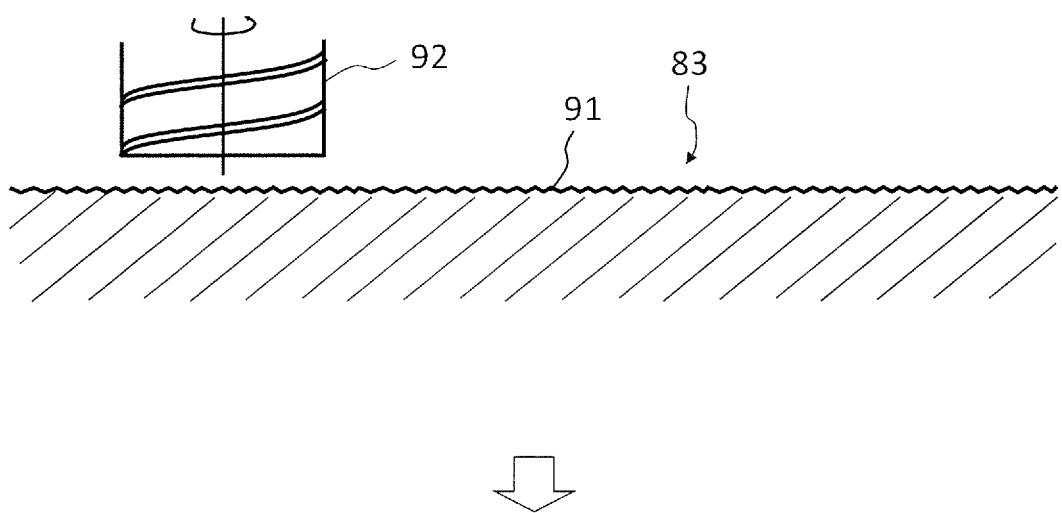
FIG. 9A is a diagram illustrating a process (roughing process) of making a mold used to injection mold the resin component of the embodiment of the present invention.
Figure 9B:
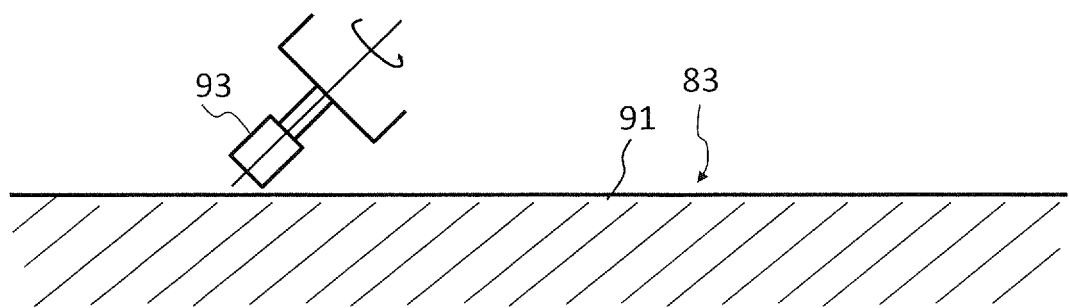
FIG. 9B is a diagram illustrating a process (grinding process) of making the mold used to injection mold the resin component of the embodiment of the present invention.

FIG. 9A illustrates a first machining process to make the mold 83, and FIG. 9B illustrates a second machining process to make the mold 83. FIGS. 10A and 10B illustrate a third machining process to make the mold 83.

First, in the first machining process illustrated in FIG. 9A, a surface 91 of the mold 83 is roughly machined. A radius end mill 92 is used as the cutting tool in the machining center of FIG. 8, and the surface (face) 91 of the mold 83 is scanned and cut with the radius end mill 92 while the radius end mill 92 is rotated. Preferably, the surface 91 is cut in the first machining process so that the flatness of the surface 91 is equal to or smaller than 3 µm, for eliminating a smoothing process to be performed in the second machining process to smoothen the surface 91.

In the second machining process of FIG. 9B, the surface 91 of the mold 83 is grinded into a mirror surface by using a rotary grinder 93 and diamond paste. Preferably, the surface 91 is grinded in the second machining process so that the flatness of the surface 91 is equal to or smaller than 1 µm, for the purpose that no difference in depth is produced in concave portions 101 and in concave portions 103 when the concave portions 101 and the concave portions 103 are machined in the third machining process. The shape of the surface (face) 91 is transferred to the resin, and thereby the bottom surface of the concave portions 43 of FIG. 4 or the bottom surface of the concave portions 68 of FIG. 6 is formed in the resin component.

As illustrated in FIGS. 10A and 10B, in the third machining process, the surface 91 of the base material of the mold 83 is machined by using a ball end mill 102. Here, the shape of a machined portion of the mold illustrated in FIG. 10A is transferred to the resin component by injection molding, and thereby the shape of the non-coating area 62 is formed; the shape of a machined portion of the mold illustrated in FIG. 10B is transferred to the resin component by injection molding, and thereby the shape of the coating area 61 is formed.

As illustrated in FIG. 10A, when the portion of the mold corresponding to the non-coating area 62 is machined, the portion is scanned and cut with the ball end mill 102 while the ball end mill 102 is rotated, so that the concave portions 101 having a first depth are formed. When the shape of the portion of the mold in which the concave portions 101 are formed is transferred to the resin component, the shape of the convex portions 65 is formed. Thus, the depth of the concave portions 101 is almost equal to the second height of the convex portions 65, which form the non-coating area (second area) 62.

On the other hand, the portion of the mold corresponding to the coating area 61 is machined as illustrated in FIG. 10B. When the portion of the mold corresponding to the coating area 61 is machined, the portion is scanned and cut with the ball end mill 102 while the ball end mill 102 is rotated, so that the concave portions 103 having a second depth smaller than the first depth are formed. When the shape of the portion of the mold in which the concave portions 103 are formed is transferred to the resin component, the shape of the convex portions 66 is formed. Thus, the depth of the concave portions 103 is almost equal to the first height of the convex portions 66, which form the coating area (first area) 61.

In addition, the portion is further scanned and cut with the ball end mill 102, so that a plurality of concave portions 104 having a third depth smaller than the second depth are formed in each of the concave portions 103. The third depth of the plurality of concave portions 104 is almost equal to the third height of the convex portions which form the fine rough surface 67. When the portion of the mold is cut to form the concave portions 104, the ball end mill 102, used to cut the portion to form the concave portions 103, may be replaced with another ball end mill having a different diameter from that of the ball end mill 102.

The material of the mold 83, machined as described above, is preferably stainless steel for its machinability and durability required in injection molding, but may be another material, such as brass or steel.

Hereinafter, various resin components including the coating area 61 and the non-coating area 62 having the above-described basic configuration, and a method of manufacturing the resin components will be described, as first to fourth examples.

First Example

Figure 11:
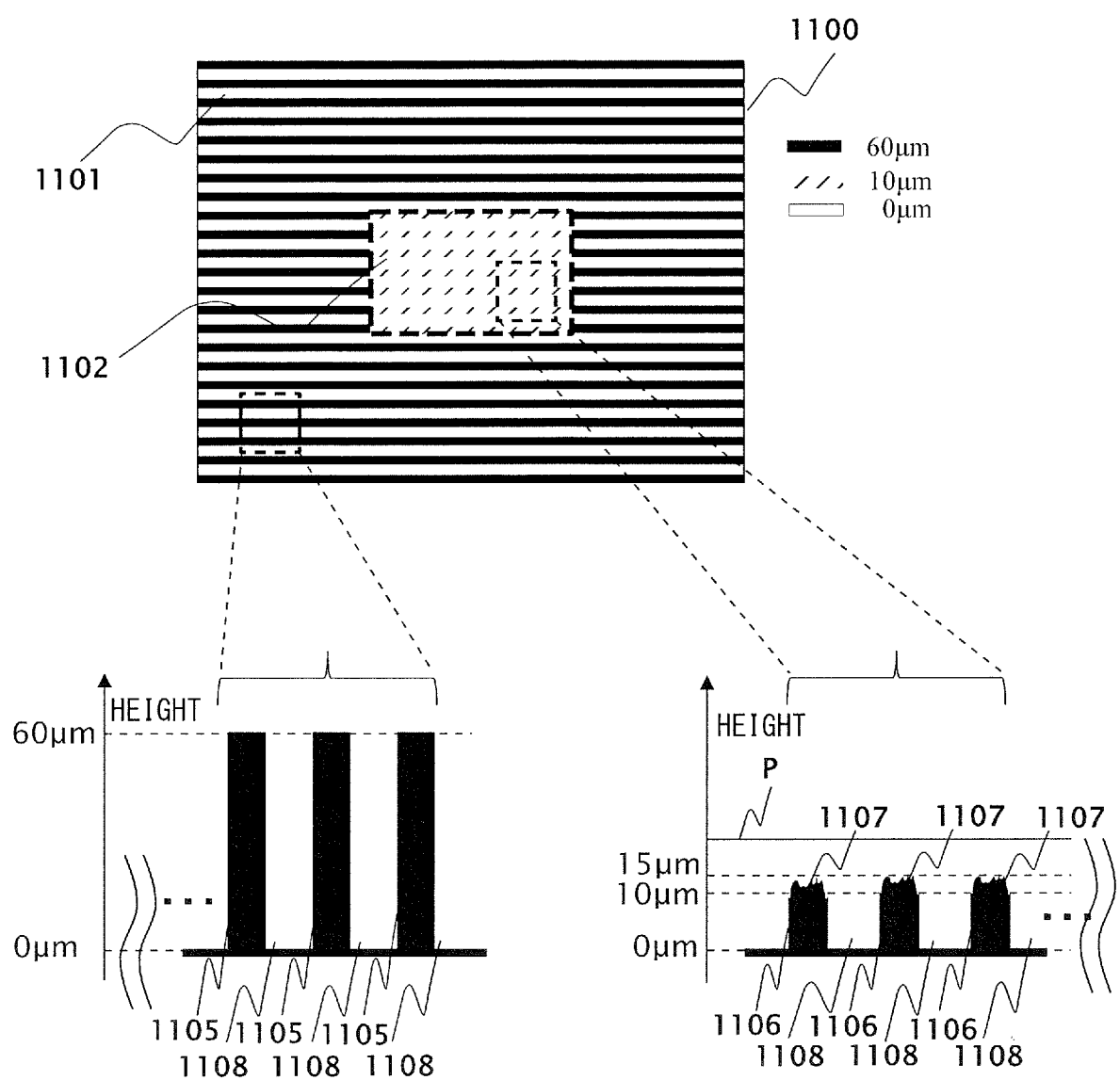
FIG. 11 is a diagram illustrating an example of a structure of a resin component of a first example of the present invention.

FIG. 11 illustrates an outer surface of a resin component 1100 of the first example. An upper diagram of FIG. 11 illustrates distribution in height of the resin component 1100 in a surface direction. As illustrated in FIG. 11, the resin component 1100 of the first example is formed like a plate, and has a thickness of 1.6 mm. On the surface of the resin component 1100, a hairline concave-and-convex pattern is formed. The width of each of the convex portions of the hairline pattern is 0.5 mm, and the width of each of the concave portions of the hairline pattern is 0.5 mm.

In addition, on the surface of the resin component 1100 of FIG. 11, a non-coating area 1101 and a coating area 1102 are formed. As an example, a lower left diagram of FIG. 11 illustrates a section of a portion of the non-coating area 1101 indicated by a broken line, and a lower right diagram of FIG. 11 illustrates a section of a portion of the coating area 1102 indicated by another broken line. As illustrated in the lower left diagram of FIG. 11, in the non-coating area (second area) 1101, the difference in height (second difference in height) between concave portions 1108 and convex portions 1105 (which form a rough surface) is 60 µm. As illustrated in the lower right diagram of FIG. 11, in the coating area (first area) 1102, the difference in height (first difference in height) between the concave portions 1108 and convex portions 1106 (which form the first rough surface) is 10 µm.

As illustrated in the lower right diagram of FIG. 11, in the coating area 1102, a fine rough surface 1107 having a difference in height (third difference in height) of 5 µm is formed on each of the tops of the convex portions 1106 so that the glossiness of the coating area 1102 is almost equal to the glossiness of the non-coating area 1101. Conditions of the fine rough surface 1107, such as distribution of the concave portions and convex portions, were determined with reference to the glossiness of the non-coating area 1101, as described below.

First, when the 60° specular glossiness of the non-coating area 1101 was measured as the glossiness of the non-coating area 1101, the 60° specular glossiness was 50. Here, for measuring the 60° specular glossiness, the handy type gloss meter PG-1M manufactured by NIPPON DENSHOKU INDUSTRIES CO. LTD. was used, as described above.

Then, the ratio of the fine convex portions to the fine concave portions (i.e. ratio of the area of the fine convex portions to the area of the fine concave portions or ratio of the width of the fine convex portions to the width of the fine concave portions) was varied, and thereby various resin components in which various fine concave and convex portions were formed on each of the hairline convex portions of the coating area 1102 were molded. Then glossiness of each resin component was measured, and a ratio obtained when the measured glossiness was about 50 was determined. As a result, when the arithmetic average height (third difference in height) Sa was 5.0 and the ratio of the fine convex portions of the fine rough surface 1107 was 80%, the glossiness of the coating area 1102 was about 50. Thus, when the arithmetic average height (third difference in height) Sa is 5.0, it is preferable to form the fine concave and convex portions on each of the tops of the convex portions 1106 of the hairline concave-and-convex portions so that the ratio of the fine convex portions to the fine concave portions per unit area is 80%.

The material of the mold used to form the resin component 1100 was stainless steel. The mold was machined by using the method described with reference to FIGS. 8 to 10B. Specifically, the mold 83 was roughly machined by using the radius end mill 92 fixed to the machining center 80 of FIG. 8 (see FIG. 9A), and the surface 91 of the mold 83 was grinded into a mirror surface by using the rotary grinder 93 and diamond paste (see FIG. 9B). Then, the shape into which the shape of the resin component 1100 was inverted was formed in the mold 83 by using the ball end mill 102 (FIGS. 10A and 10B). After that, injection molding was performed by using the mold 83 to form the resin component 1100. The resin material used for the injection molding may be black HIPS.

The outer surface of the resin component 1100 molded as described above was visually checked by an observer with average eyesight. As a result, although the difference in height of convex portions between the coating area and the non-coating area was slightly perceived at a certain angle at which the observer saw the resin component 1100, the visible gap in glossiness between the coating area and the non-coating area was effectively reduced compared to the conventional resin component.

Second Example

In the above-described embodiment and the first example, the basic configuration to reduce the difference in glossiness between the coating area and the non-coating area of the outer surface of the resin component has been described. In the basic configuration, however, although the difference in glossiness in the outer surface of the resin component is reduced, the difference in height of convex portions between the coating area and the non-coating area may be perceived at a certain angle at which an observer sees the resin component. Thus, in the second example, the difference in height between the concave portions and the convex portions is reduced step by step so that the difference in height between the concave portions and the convex portions, in the coating area and the non-coating area of the outer surface of the resin component, is also hardly perceived. In addition, in the second example, the fine rough surface is formed not only on the first rough surface which forms the coating area (first area), but also on the second rough surface which forms the non-coating area (second area).

Figure 12A:
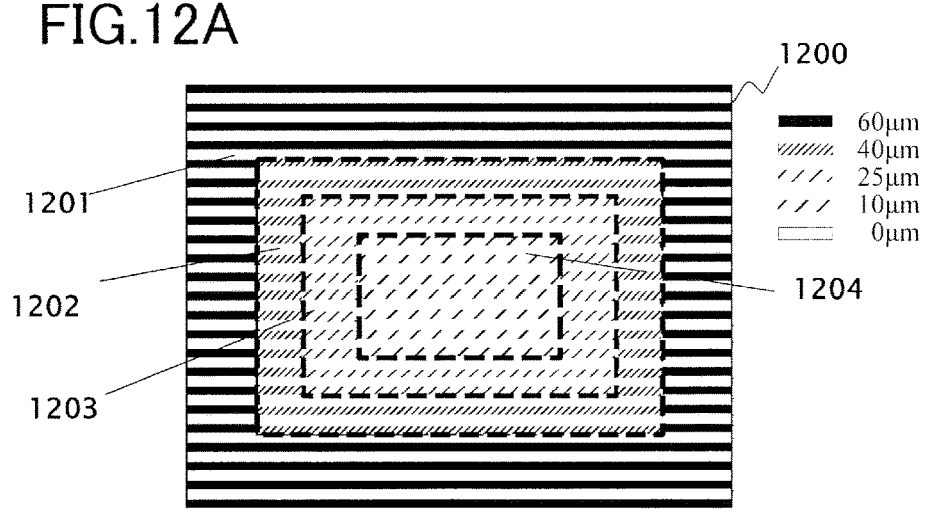
FIG. 12A is a plan view schematically illustrating an example of a structure of a resin component of a second example of the present invention.

FIGS. 12A to 12E are diagrams for illustrating the structure of the outer surface of a resin component 1200 of the second example. The outer surface of the resin component 1200 whose pattern is schematically illustrated in FIG. 12A is a rough surface including a coating area 1204 and a non-coating area 1201 and having a hairline pattern. FIG. 12A illustrates distribution in height of the outer surface of the resin component 1200. In FIG. 12A, the height of the convex portions (which form a rough surface) of the non-coating area (second area) 1201 decreases, step by step, as the non-coating area 1201 becomes closer to the coating area 1204. Specifically, the non-coating area 1201 includes a transition area 1202 and another transition area 1203 in which the height (second difference in height) of the convex portions (which form a rough surface) decreases.

Figure 12B:
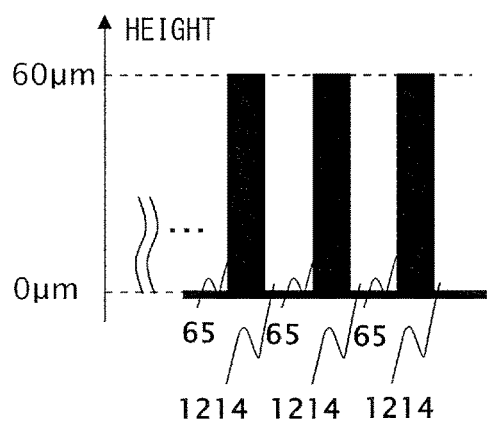
FIG. 12B is a schematic partial sectional view of the resin component of the second example of the present invention.
Figure 12C:
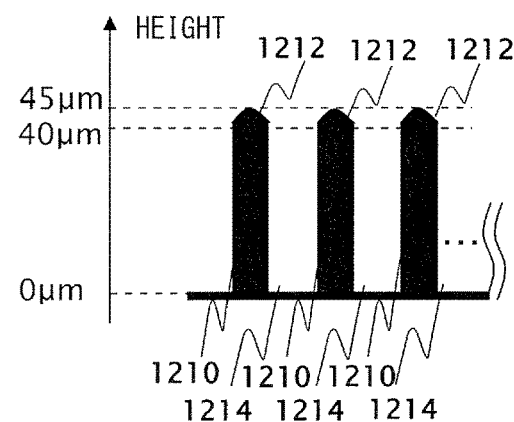
FIG. 12C is a schematic partial sectional view of the resin component of the second example of the present invention.
Figure 12D:
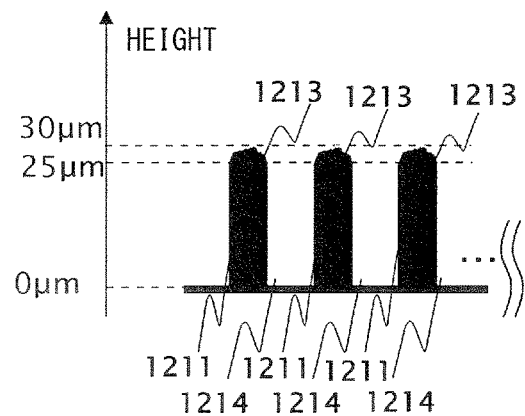
FIG. 12D is a schematic partial sectional view of the resin component of the second example of the present invention.
Figure 12E:
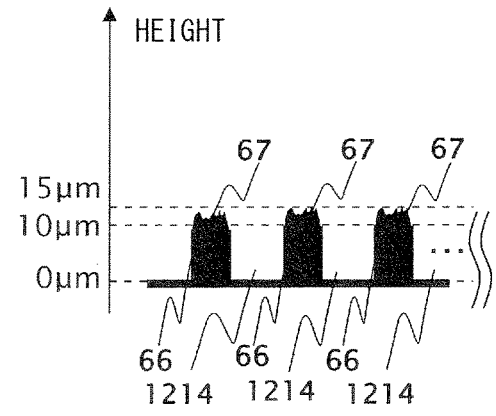
FIG. 12E is a schematic partial sectional view of the resin component of the second example of the present invention.

FIG. 12B illustrates a structure of a section of the non-coating area 1201 which is not the transition areas, and a size of the convex portions. FIG. 12C illustrates a structure of a section of the transition area 1202, and a size of the convex portions. FIG. 12D illustrates a structure of a section of the transition area 1203, and a size of the convex portions. FIG. 12E illustrates a structure of a section of the coating area 1204, and a size of the convex portions.

As illustrated in FIG. 12B, the height of the convex portions (which form a rough surface) of the outermost non-coating area 1201 which is not the transition areas is 60 µm. The fine rough surface may not be formed on each of the tops of the convex portions of the outermost rough surface. As illustrated in FIG. 12E, the height (first difference in height) of the convex portions 66 (which form the first rough surface) of the coating area 1204 with respect to the concave portions 1214 is 10 µm.

The width of the transition area 1202 may be about 20 mm, and the width of the transition area 1203 may also be about 20 mm. As illustrated in FIGS. 12C and 12D, the height of the convex portions (which form a rough surface)

decreases, step by step, as the non-coating area becomes closer to the coating area. Specifically, the height of the convex portions becomes 40 µm where the non-coating area becomes closer to the coating area by 20 mm from the outer edge of the outermost non-coating area which is not the transition areas, and becomes µm where the non-coating area becomes further closer to the coating area by 20 mm from the outer edge of the transition area 1202.

As illustrated in FIG. 12C, the transition area 1202 includes the convex portions 1210 having a height of 40 µm, fine rough surfaces 1212 formed on the tops of the convex portions 1210 and having a height of 5 µm, and the concave portions 1214. As illustrated in FIG. 12D, the transition area 1203 includes the convex portions 1211 having a height of 25 µm, fine rough surfaces 1213 formed on the tops of the convex portions 1211 and having a height of 5 µm, and the concave portions 1214.

The size of each rough surface can be determined by making prototypes as described below and evaluating glossiness of the prototypes. For example, when the 60° specular glossiness of the non-coating area 1201 which is not the transition areas is 50, the height of the hairline convex portions 1210, the height of the hairline convex portions 1211, and the distribution of the concave and the convex portions are determined in accordance with the 60° specular glossiness of 50. Then, for each height of the hairline convex portions, various resin components are molded, with the ratio of the fine convex portions to the fine concave portions, formed on each of the tops of the convex portions, being varied. By evaluating the molded resin components, a combination in the height and the ratio which achieves a glossiness of about 50 can be obtained. For example, Table 1 illustrates one example of combination (which achieves a glossiness of 50) in the difference in height (second difference in height) of the convex portions of the coating area 1204, the arithmetic average height (third difference in height) Sa, and the ratio of the fine convex portions to the fine concave portions.

the fine convex portions to the fine concave portions per unit area of the fine rough surface 1212 is 30%, and the ratio of the fine convex portions to the fine concave portions per unit area of the fine rough surface 1213 is 50%.

The method of machining a mold used to mold the resin component 1200 of FIG. 12 is the same as that illustrated with reference to FIGS. 8 to 10B, and thus the duplicated description thereof will be omitted.

Also for the second example, the outer surface of the resin component 1200 was visually checked by an observer with average eyesight. As a result, in addition to the effect of the first example, the difference on the boundary was more hardly perceived by the observer. This is because the transition areas 1202 and 1203 are formed between the outermost non-coating area 1201 and the coating area 1204, allowing the height of the convex portions to decrease step by step.

Third Example

Figure 13:
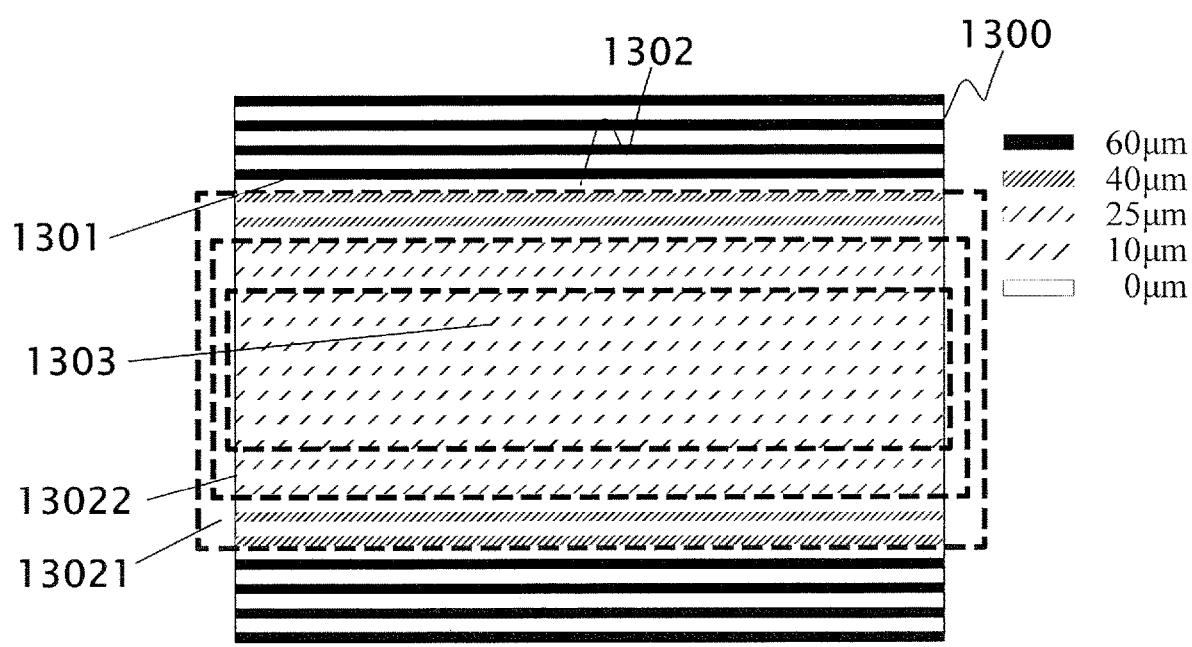
FIG. 13 is a diagram illustrating an example of a structure of a resin component of a third example of the present invention.

FIG. 13 illustrates an outer surface of a resin component 1300 of the third example. In the resin component 1300 of the third example, the width of each of the concave portions of the hairline, the width of each of the convex portions of the hairline, and the difference in height between the concave portions and the convex portions of each area are the same as those of the second example. The third example, however, differs from the second example in that the height of a (outermost) non-coating area 1301 which is not transition areas, a transition area 13021, a transition area 13022, and a coating area 1303 changes in one direction.

In FIG. 13, the non-coating area 1301 which is not the transition areas, the transition area 13021, the transition area 13022, and the coating area 1303, respectively, correspond to the non-coating area 1201 which is not the transition areas, the transition area 1202, the transition area 1203, and the coating area 1204 of FIG. 12.

TABLE 1

RELATIONSHIP BETWEEN HEIGHT OF CONVEX PORTIONS
OF HAIRLINE PATTERN AND FINE CONCAVE PORTIONS
AND FINE CONVEX PORTIONS (GLOSSNESS ≈ 50)

| HEIGHT (µm) OF CONVEX PORTIONS OF HAIRLINE PATTERN | ARITHMETIC AVERAGE HEIGHT Sa (µm) OF FINE CONCAVE PORTIONS AND FINE CONVEX PORTIONS | RATIO (%) OF FINE CONVEX PORTIONS TO FINE CONCAVE PORTIONS |
|---|---|---|
| 10 | 5.0 | 80 |
| 25 | 2.2 | 50 |
| 40 | 1.5 | 30 |

In Table 1, when the height of the hairline convex portions is 40 µm, it is suitable for obtaining a glossiness of 50 that the ratio of the fine convex portions to the fine concave portions is 30% and the arithmetic average height Sa of the fine concave and convex portions is 1.5 µm. In addition, when the height of the hairline convex portions is 25 µm, it is suitable for obtaining a glossiness of 50 that the ratio of the fine convex portions to the fine concave portions is 50% and the arithmetic average height Sa of the fine concave and convex portions is 2.2 µm. In the coating area 1204, when the height of the hairline convex portions is 10 µm, it is suitable for obtaining a glossiness of 50 that the ratio of the fine convex portions to the fine concave portions is 80% and the arithmetic average height Sa of the fine concave and convex portions is 5.0 µm. According to Table 1, the ratio of Similar to those of FIG. 12, the heights of the convex portions (which form a rough surface) of the non-coating area 1301 which is not the transition areas, the transition area 13021, the transition area 13022, and the coating area 1303 are, respectively, 60 µm, 40 µm, 25 µm, and 10 µm.

In the third example, however, the difference in height in the rough surface does not change in a direction parallel to a direction in which the convex portions and the concave portions (which form the hairline) extend. For example, the difference in height changes in the order of 60 µm, 40 µm, 25 µm, and 10 µm, in a direction orthogonal to the direction in which the hairline convex portions and the concave portions extend.

One reason that the difference in height of the rough surface does not change in the direction parallel to the hairline is as follows: if one structure, such as a convex portion or a concave portion of a hairline, continuously extends, or if the one structure is adjacent to another structure which is the same as the one structure, the change in height of the one structure or the one structure and the other structure is easily perceived. In contrast, if one structure does not continuously extend, or if the one structure is not adjacent to another structure which is the same as the one structure, that is, if one concave portion is interposed between two adjacent convex portions (the convex portions are discontinuously disposed), the change in height is hardly perceived.

Thus, in the third example, in the non-coating area 1301 which is not the transition areas, the transition area 13021, the transition area 13022, and the coating area 1303, the difference in height does not change in the direction (i.e. right and left direction in FIG. 13) parallel to the hairline. However, as illustrated in FIG. 13, the difference in height of the convex portions changes, step by step, in a direction (i.e. vertical direction in FIG. 13) orthogonal to the hairline, in which the concave portions and the convex portions are alternately disposed. Specifically, the difference in height changes at a position between the non-coating area 1301 which is not the transition areas and the transition area 13021, and a position between the transition area 13021 and the transition area 13022.

The method of machining a mold used to mold the resin component 1300 of FIG. 13 is the same as that illustrated with reference to FIGS. 8 to 10B, and thus the duplicated description thereof will be omitted.

Also for the third example, the outer surface of the resin component 1300 was visually checked by an observer with average eyesight. In the third example, the first area has a first difference in height and the second area has a second difference in height, and the first area and the second area are constituted by the areas 1301, 13021, 13022, and 1303. The areas 1301, 13021, 13022, and 1303 have a length equal to the full length of the hairline, which forms a rough surface and extends in a longitudinal direction (i.e. right and left direction in FIG. 13). As described above, since the height of each of the convex portions of the hairline (which forms rough surfaces of the areas 1301, 13021, 13022, and 1303) does not change in the longitudinal direction, the difference in height in the direction parallel to the hairline, perceived in the second example, can be eliminated.

Fourth Example

In the first to the third examples, the outer rough surfaces of the resin components have a hairline pattern in which concave portions and convex portions are periodically arranged. In addition, the present invention can also be applied to the fourth example in which the outer surface of the resin component has a grain pattern as illustrated in FIG. 3B. The grain pattern is formed by randomly formed concave and convex portions. The size of each of the concave or convex portions is less than 1 mm, and the macro gloss changes in accordance with the height between the concave portions and the convex portions. As illustrated in FIG. 3B, the grain pattern is a pattern in which concave portions and convex portions, having different sizes, are randomly disposed.

Figure 14A:
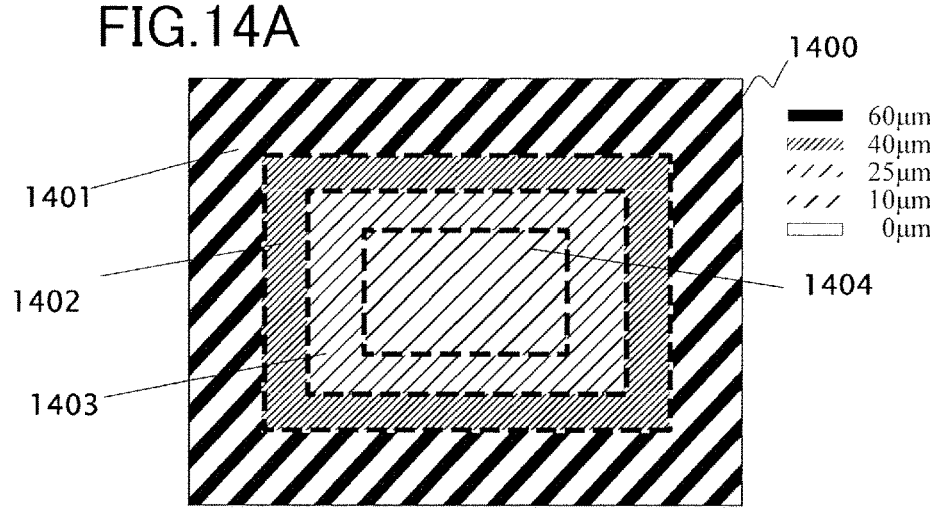
FIG. 14A is a plan view schematically illustrating an example of a structure of a resin component of a fourth example of the present invention.

FIGS. 14A to 14E are diagrams for illustrating a structure of the outer surface of a resin component 1400 of the forth example. The outer surface of the resin component 1400, which is schematically illustrated in the plan view of FIG. 14A, is a rough surface having a grain pattern and forming a coating area and a non-coating area. FIG. 14A illustrates distribution in height of the outer surface of the resin component 1400. In the fourth example, the height (second difference in height) of the convex portions, which form the rough surface (second area), decreases, step by step, as the non-coating area 1401 becomes closer to the coating area 1404. Specifically, the non-coating area 1401 includes a transition area 1402 and a transition area 1403 so that the height of the convex portions (second difference in height) decreases, step by step, as the non-coating area 1401 becomes closer to the coating area 1404.

Figure 14B:
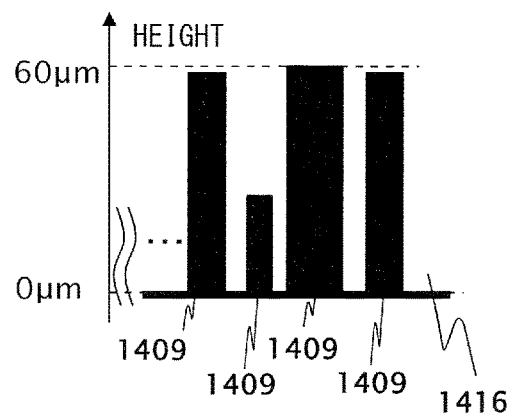
FIG. 14B is a schematic partial sectional view of the resin component of the fourth example of the present invention.
Figure 14C:
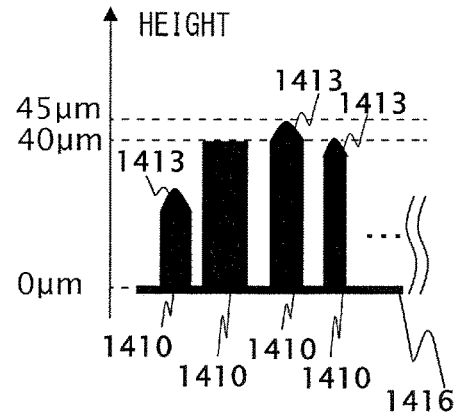
FIG. 14C is a schematic partial sectional view of the resin component of the fourth example of the present invention.
Figure 14D:
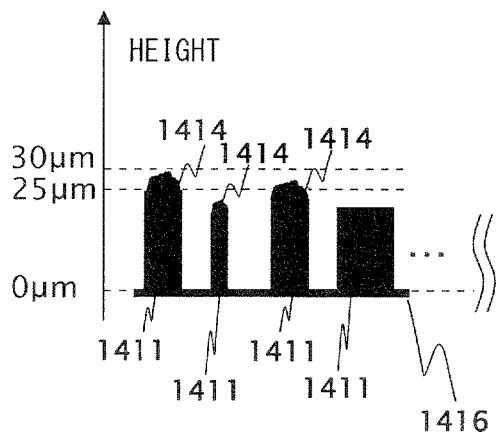
FIG. 14D is a schematic partial sectional view of the resin component of the fourth example of the present invention.
Figure 14E:
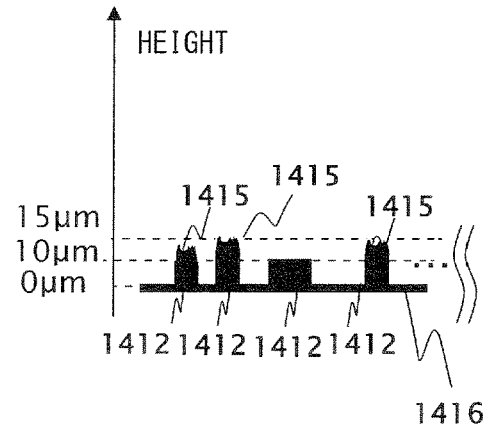
FIG. 14E is a schematic partial sectional view of the resin component of the fourth example of the present invention.

FIG. 14B illustrates a structure of a section of the non-coating area 1401 which is not the transition areas, and a size of the convex portions. FIG. 14C illustrates a structure of a section of the transition area 1402, and a size of the convex portions. FIG. 14D illustrates a structure of a section of the transition area 1403, and a size of the convex portions. FIG. 14E illustrates a structure of a section of the coating area 1404, and a size of the convex portions. As in FIG. 12A, the differences in height of the areas 1401 to 1404 are, respectively, 60 µm, 40 µm, 25 µm, and 10 µm. Here, the difference in height may be expressed by a maximum value of heights of convex portions of each area of the grain pattern, or by an arithmetic average height Sa of convex portions of each area of the grain pattern.

In addition, fine rough surfaces 1413, 1414, and 1415 illustrated in FIGS. 14C, 14D, and 14E are, respectively, formed on each of the tops of the convex portions of the transition area 1402, the transition area 1403, and the coating area 1404. The fine rough surfaces, however, are not formed on each of the tops of the convex portions of the outermost non-coating area 1401 which is not the transition areas. The difference in height of each of the fine rough surfaces 1413 to 1415 is determined by the below-described fine-rough-surface setting so that all of the 60° specular glossiness values of the areas are preferably about 50 or the maximum difference in the 60° specular glossiness values of the areas is 10 or less.

Also in the fourth example, the glossiness can be selected by combining below-described sizes or numerical values. That is, the combination is composed of the first difference in height of the first rough surface on which the fine rough surface is formed, the second difference in height of the second rough surface, the third difference in height of the convex portions which form the fine rough surface, and the ratio of the fine convex portions which form the fine rough surface. However, unlike the above-described hairline structure (pattern), the distribution of the concave and convex portions of the areas 1401 to 1404, and the difference in height between the concave portions and the convex portions are random. Since the grain pattern is random as described above, the size is different from that of the second example (FIG. 12, Table 1).

The size of each rough surface can be determined by making prototypes as described below and evaluating glossiness of the prototypes. When the 60° specular glossiness of the non-coating area 1401 which is not the transition areas is 50, the height of the convex portions of the fine rough surface 1414 of the grain pattern, the height of the convex portions of the fine rough surface 1413 of the grain pattern, and the distribution of the concave and convex portions are determined in accordance with the 60° specular glossiness of 50. Then, for each height of the convex portions of the grain pattern, various resin components are molded, with the ratio of the fine convex portions to the fine concave portions, formed on each of the tops of the convex portions, being varied. By evaluating the molded resin components, a combination in the height and the ratio which achieves a glossiness of about 50 can be obtained. For example, Table 2 illustrates one example of a combination (which achieves a glossiness of 50) in the difference in height (first or second difference in height) of the convex portions of the grain pattern, the arithmetic average height (third difference in height) Sa, and the ratio of the fine convex portions to the fine concave portions.

TABLE 2

RELATIONSHIP BETWEEN HEIGHT OF CONVEX PORTIONS OF GRAIN PATTERN AND FINE CONCAVE PORTIONS AND FINE CONVEX PORTIONS (GLOSSNESS ≈ 50)

| HEIGHT (μm) OF CONVEX PORTIONS OF GRAIN PATTERN | ARITHMEHC AVERAGE HEIGHT Sa (μm) OF FINE CONCAVE PORTIONS AND FINE CONVEX PORTIONS | RATIO (%) OF FINE CONVEX PORTIONS TO FINE CONCAVE PORTIONS |
|---|---|---|
| 10 | 5.0 | 80 |
| 25 | 1.9 | 40 |
| 40 | 1.1 | 20 |

In Table 2, when the height of the convex portions of the grain pattern is 40 μm, it is suitable for obtaining a glossiness of 50 that the ratio of the fine convex portions to the fine concave portions is 20% and the arithmetic average height Sa of the fine concave and convex portions is 1.1 μm. In addition, when the height of the convex portions of the grain pattern is 25 μm, it is suitable for obtaining a glossiness of 50 that the ratio of the fine convex portions to the fine concave portions is 40% and the arithmetic average height Sa of the fine concave and convex portions is 1.9 μm. In the coating area 1404, when the height of the convex portions of the grain pattern is 10 μm, it is suitable for obtaining a glossiness of 50 that the ratio of the fine convex portions to the fine concave portions is 80% and the arithmetic average height Sa of the fine concave and convex portions is 5.0 μm. According to Table 2, the ratio of the fine convex portions to the fine concave portions per unit area of the fine rough surface 1413 is 20%, and the ratio of the fine convex portions to the fine concave portions per unit area of the fine rough surface 1414 is 40%.

The method of machining a mold used to mold the resin component 1400 of FIG. 14 is the same as that illustrated with reference to FIGS. 8 to 10B, and thus the duplicated description thereof will be omitted.

Also for the fourth example, the outer surface of the resin component 1400, made in this manner, was visually checked by an observer with average eyesight. As a result, as in the second example, the difference on the boundary was hardly perceived by the observer. This is because the transition area 1402 and the transition area 1403 are formed between the outermost non-coating area 1401 and the innermost coating area 1404, allowing the height (second difference in height) of the convex portions, which form the rough surface (second area), to decrease step by step.

Modifications

In the above configurations, the fine rough surface used to adjust glossiness is formed on each of the tops of the unshielded convex portions, which form the outer rough surface of the resin component. The fine rough surface, however, may be formed on the bottom surfaces which form the rough surface, or on both of the concave portions and the convex portions which form the rough surface. Here, the above description has been made for the case where the surface of the mold, used to transfer the shape of the mold to the resin component to form the convex portions of the resin component, is formed by cutting the surface of the mold. On the other hand, if the surface of the mold is built up, the surface of the mold can transfer the shape of the mold to the resin component to form the concave portions of the resin component. If the surface of the mold, used to transfer the shape of the mold to form a concave portion having a fine rough surface (fine concave and fine convex portions), is formed, the surface of the mold may be built up.

In the above-described examples, the 60° specular glossiness is used as glossiness, but the present disclosure is not limited to this. For example, image clarity defined in JIS K7374 may be used, or glossiness measured at an appropriate angle may be used together with the 60° specular glossiness. Alternatively, the measurement may be performed for each of the non-coating area, the transition area, and the coating area, by using a gonio-spectrophotometric color measurement system, and color difference $\Delta E_\theta$ between two adjacent areas may be used for each of angles θ, by using an obtained CIELab value. In this case, setting may be performed so that the color difference $\Delta E_\theta$ is equal to or smaller than a predetermined value.

In the above description, the resin component is made by using hot stamping, as coating. However, coating for numerals, characters, a figure, or a logo may be performed by using any method other than hot stamping, such as printing, painting, or attaching an information bearing member such as a seal or a sticker. In addition, the present invention may be applied for reducing the difference in glossiness caused by failure in molding, such as a weld line. The weld line is a change in glossiness in the external appearance of a resin component, caused when the welding of the resin component fails.

In the above-described embodiment and examples, the mold used for the resin component is made by using an identical cutting tool. However, the method of making the mold is not limited to this. For example, a cutting tool with a large diameter may be used to form a pattern for convex portions, and a cutting tool with a small diameter may be used to form a pattern for fine rough surfaces. The mold may be made by using another method, such as a method using a laser beam machine. Alternatively, the resin component of the present invention may be made without using any mold. For example, the resin components as illustrated in FIGS. 11 to 14 may be directly made by using a 3D printer, which uses resin.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-119321, filed Jun. 22, 2018, and Japanese Patent Application No. 2019-096109, filed May 22, 2019, which are hereby incorporated by reference herein in their entirety.

What is claimed is:

1. A resin product comprising a base portion,
   wherein the base portion comprises:
   a first portion, an outer surface of which is defined as a first area; and
   a second portion, an outer surface of which is defined as a second area,
   wherein a material of the first portion of the base portion is the same resin material as a material of the second portion of the base portion,
   wherein the first area comprises a surface pattern comprising a concave and convex portion having a first difference in height,
   wherein the second area comprises a surface pattern comprising a concave and convex portion having a second difference in height, larger than the first difference in height, and
   wherein an arithmetic average height of a top of a convex portion of the concave and convex portion having the first difference in height is larger than an arithmetic average height of a top of a convex portion of the concave and convex portion having the second difference in height.

2. The resin product according to claim 1, wherein the first difference in height is smaller than 15 μm.

3. The resin product according to claim 1, wherein the second difference in height is 15 μm to less than 500 μm.

4. The resin product according to claim 1, wherein a difference between a 60° specular glossiness of the first area and a 60° specular glossiness of the second area is 10 or less.

5. The resin product according to claim 1, wherein the base portion further comprises a transition area formed between the first area and the second area,
   wherein the transition area comprises a surface pattern comprising a concave and convex portion having a difference in height, and
   wherein the difference in height of the concave and convex portion of the transition area has a value between the first difference in height and the second difference in height.

6. The resin product according to claim 1, wherein the surface pattern of the first area and/or the second area is a grain pattern.

7. The resin product according to claim 1, wherein the surface pattern of the first area and/or the second area is a hairline pattern in which a linear convex portion and a linear concave portion are alternately formed.

8. The resin product according to claim 7, wherein a difference in height of the concave and convex portion of the second area decreases as the second area becomes closer to the first area in a direction orthogonal to a line of the linear convex portion.

9. The resin product according to claim 1, wherein the base portion further comprises a third area adjacent to the first area,
   wherein the third area comprises a surface pattern comprising a concave and convex portion having a difference in height, equal to the first difference in height, and
   wherein the third area is coated with at least one of characters, numerals, and a figure.

10. An electronic device comprising the resin product according to claim 1, and an electronic component.

11. A resin product comprising an outer surface comprising a first area and a second area,
    wherein the first area comprises a surface pattern comprising a concave and convex portion having a first difference in height,
    wherein the second area comprises a surface pattern comprising a concave and convex portion having a second difference in height, larger than the first difference in height,
    wherein an arithmetic average height of a top of a convex portion of the concave and convex portion having the first difference in height is larger than an arithmetic average height of a top of a convex portion of the concave and convex portion having the second difference in height,
    wherein the outer surface further comprises a third area adjacent to the first area,
    wherein the third area comprises a surface pattern comprising a concave and convex portion having a difference in height, equal to the first difference in height, and
    wherein the third area is coated with at least one of characters, numerals, and a figure.

* * * * *